United States Patent [19]
Law

[11] Patent Number: 5,875,190
[45] Date of Patent: Feb. 23, 1999

[54] ASYNCHRONOUS TRANSFER MODE SWITCHING SYSTEM

[76] Inventor: Ka Lun Law, 302-3181 Bayview Avenue, North York, Ontario, Canada, M2K 2Y2

[21] Appl. No.: 720,107

[22] Filed: Sep. 27, 1996

[51] Int. Cl.$^6$ ..................................................... H04J 3/24
[52] U.S. Cl. ......................... 370/395; 370/423; 370/434; 370/458
[58] Field of Search .................................. 370/389, 395, 370/399, 423, 432, 434, 458, 905

[56] References Cited

U.S. PATENT DOCUMENTS

| | | |
|---|---|---|
| 4,754,451 | 6/1988 | Eng et al. . |
| 4,760,570 | 7/1988 | Acampora et al. . |
| 5,099,473 | 3/1992 | Gupta et al. . |
| 5,172,371 | 12/1992 | Eng et al. . |
| 5,256,958 | 10/1993 | Eng et al. . |
| 5,274,642 | 12/1993 | Widjaja et al. . |
| 5,280,586 | 1/1994 | Kunz et al. ............................. 370/434 |
| 5,408,469 | 4/1995 | Opher et al. ............................ 370/399 |
| 5,412,646 | 5/1995 | Cyr et al. . |
| 5,490,138 | 2/1996 | Niestegge et al. . |
| 5,499,239 | 3/1996 | Munter .................................. 370/423 |
| 5,636,210 | 6/1997 | Agrawal ................................ 370/395 |
| 5,724,351 | 3/1998 | Caoh et al. ............................ 370/905 |

OTHER PUBLICATIONS

Tobagi, "Fast Packet Switch Architectures," etc. IEEE Proc., vol. 78, No. 1, Jan. 1990, pp. 133–167.
Ahmadi et al "A High–Performance Switch Fabric" IEEE INFOCOMM '88, 1988, pp. 0009–0018.
Yeh et al "The Knockout Switch", etc. IEEE JSAC SAC–5(8), Oct. 1987 pp. 1274–1283.
Chen et al "SCOQ" A Fast Packet Switch etc. IEEE/ACM Trans. on Networking, vol. 1, No. 1 Feb. 1993, pp. 142–151.
Chao, "A Recursive Modular Terabit/Second ATM Switch" IEEE JSAC, vol. 9, No. 8, Oct. 1991 pp. 1161–1172.
Wang et al "Christmas–Tree Switch", etc. INFOCOMM '91, 1991, vol. 1, pp. 0163–0170.
Karol et al "Perf. Analysis–Growable Architecture", etc. Globecom '89, 1989, pp. 1173–1180.
Hickey et al "Implementation of High Speed", etc Proceedings of XIII International Switching Symposium, vol. 1, 1990, pp. 75–84.
Suh et al "Perf. Analysis of Knockout Switch", etc. IEEE Proc.–Commun vol. 141, No. 3, Jun 1994, pp. 183–189.
Zhong et al "A Recursive Copy Network", etc. XIV International Switching Symposium, 1992, pp. 161–165.
HLUCHYJ, et al "Queueing in High–Performance", etc. IEEE JSAC, vol. 6, No. 9, Dec., 1988 pp. 1587–1597.

(List continued on next page.)

*Primary Examiner*—Douglas W. Olms
*Assistant Examiner*—Shick Hom
*Attorney, Agent, or Firm*—Barrigar & Moss

[57] ABSTRACT

A self-routing, modular, switching arrangement for distributing and concentrating input data packets that is comprised of a distribution section and a concentration section comprising N priority concentration sorters each having N inputs and L outputs, L being less than N. The sorters comprise means for ordering data packets according to priority information and for transferring only the L data packets from N inputs which have the highest relative priorities. A multiplicity of the switching arrangements can be interconnected to provide an expanded switching arrangement. The distribution network may be of a radix-r tree configuration in which multicast elements reference an extra cell header which identifies the output links of a multicast elements to which a data packet is to be transferred. The length of the extra cell header may be variable and determined by the output links of the multicast elements to which the data packet is to be transferred, wherein the extra cell header excludes data identifying descendent output links to which the data packet is not transferred. Also provided is an output port controller for multiplexing sets of L data packets input to said controller at successive time slots according to their relative priority levels and for producing as an output one data packet having a higher relative priority.

13 Claims, 11 Drawing Sheets

OTHER PUBLICATIONS

Karol, et al "Input Versus Output Queueing", etc. IEEE Trans. on Commun, vol. 1, COM–35, No. 12, Dec. 1987, pp. 1347–1356.

Kim et al "Call Scheduling Algorithmas", etc. IEEE Trans. on Commun, vol. 40, No. 3, Mar. 1992, pp. 625–635.

Batcher, "Sorting Networks", etc. Spring Joint Computer Conference 1968, pp. 307–314.

Nakatami et al "K–Way Bitonic Sort", IEEE Trans. on Comp., vol. 38, No. 2, Feb. 1989 pp. 283–288.

Lee et al "On Sorting Multiple Bitonic", etc. 1994 Internaitonal Conference on Parallal Processing, 1994, pp. I–121–I–125.

Lee et al "A Multiway Merge Sorting Network" IEEE Trans. Parallel and Distributed Systems, vol. 6, No. 2, Feb. 1995, pp. 211–215.

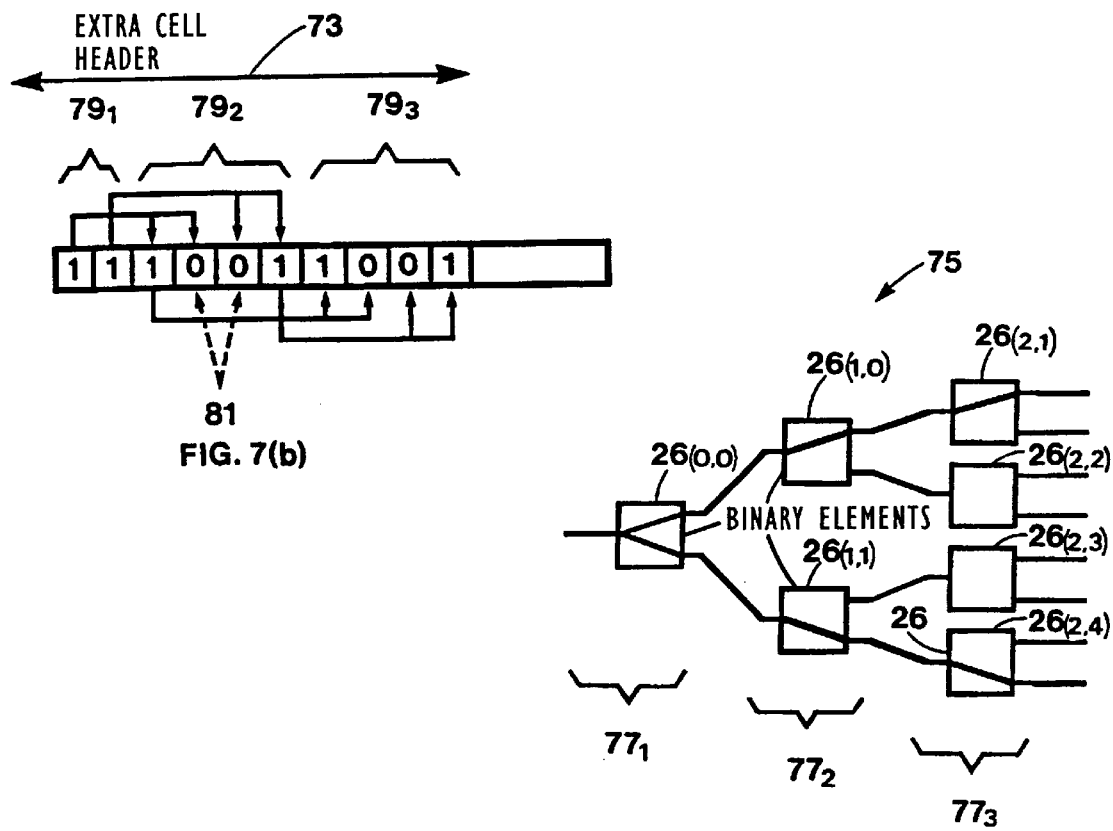
FIG. 7(b)
FIG. 7(a)
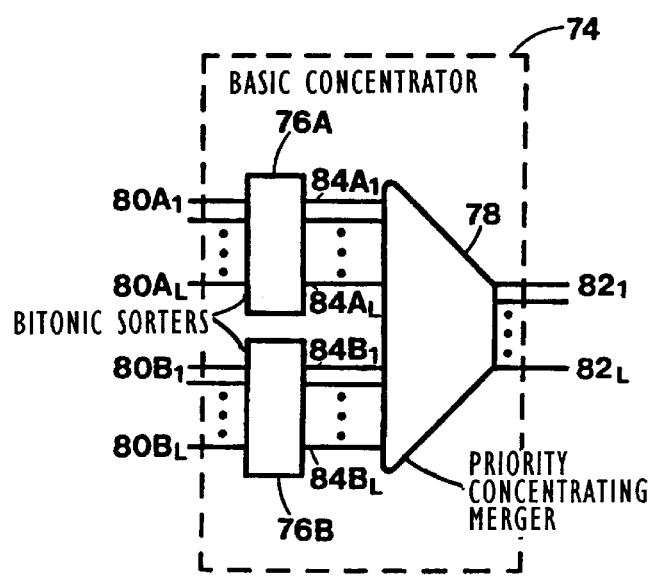
FIG. 8

OUTPUT PORT CONTROLLER

ASYNCHRONOUS TRANSFER MODE SWITCHING SYSTEM

FIELD OF THE INVENTION

The present invention relates in general to packet switching systems and more particularly to a modular core switch fabric that is self-routing, expandable and provides multicast services and priority sorting functions, and an output port controller for a packet switch.

BACKGROUND OF INVENTION

Emerging multimedia and high-speed data applications are generating a demand for networks that are able to multiplex and switch a wide spectrum of data rates simultaneously. Asynchronous Transfer Mode (ATM) systems are widely recognized as the broadband integrated services digital network (B-ISDN) networking paradigm that will allow flexibility and efficiency in high-speed, multi-service, multimedia networks.

ATM is based on a fixed size connection-oriented cell switching methodology. An ATM cell is comprised of a well-defined and size-limited header area and user information area. The length of an ATM cell is 53 bytes, with a 5 byte header field and a 48 byte information field. The small fixed cell size and limited header functionality has an important influence on the design of an optimal ATM switching architecture. Many researchers have investigated the design of the core ATM switching fabric and a wide range of different switching architectures have been proposed in the last decade.

An ideal switch should provide fibre-like performance, meaning that it should provide low transmission delay and low bit error rate, and it should also be transparent to all users. Therefore, the principal function of an ATM switch is to transmit incoming cells to their destination addresses without incurring extra delays and excessive cell losses.

To date, only a few researchers have investigated the problems in constructing large scale switch architectures. As discussed in K.Y.Eng, M. J. Karol, Y. S. Yeh, "A Growable Packet (ATM) Switch Architecture: Design Principles and Applications", *IEEE Trans. Commun.*, Vol.40, No.2, pp.423–430, Feb. 1992, various switches can be theoretically designed to large dimensions, but the technological and physical constraints (e.g. chip sizes, board sizes and speed of interconnects) often impose a practical limit on their maximum size. In order to build larger switching systems, two or more smaller switches have to be interconnected; however, the resulting complete architecture may no longer be the same as that of the individual switches because simple interconnection of the smaller switches creates several levels of queuing delay and results in severe performance degradation if congestion occurs at intermediate modules.

The major difficulty in implementing large scale switching networks is the cell synchronization within the network, which is mainly due to the complexity of interstage wiring. The drawback is that the length of interconnection wires between stages grows geometrically with respect to the size of the network, although the complexity of the hardware logic of each switching element remains the same. When the wires connected to the same switching element are not identical in length, there is a discrepancy in the cell arrival delay. As the switch network grows, the differences in wire lengths increases, thus compounding the problem of signal synchronization. As a result, cell synchronization due to differences in the length of interconnection wires represents a major difficulty in implementing high-speed networks.

The realization of large scale ATM switches has problems such as heat dissipation, power consumption and wire routing. Additionally, the speed of the output multiplexer and the speed of the switching elements represent other constraints. Moreover, the enormous number of required overlapping wires has precluded the implementation of the network on a single chip. This has caused researchers to find other ways of building a large network, such as the three-dimensional structure disclosed in D. Wilson, "A New Architecture for Packaging Wideband Communication Equipment Using a 3-D, Orthogonal Edge-to-Edge Topology", *Proc. IEEE GLOBECOM '88*, pp.430–434, 1988. Even though many space switch designs, such as those discussed in F. A. Tobagi, "Fast Packet Switch Architectures for Broadband Integrated Services Digital Networks", *Proc. IEEE*, Vol.78, No.1, pp.133–167, Jan., 1990, have a reasonable hardware complexity in terms of the number of 2×2 switching elements, many of the above-stated difficulties have been found in implementing high-speed multi-stage interconnection networks. Despite advances in ATM switch architectural designs, practical switch dimensions continue to be severely limited by both the technological and physical constraints of packaging.

Multipoint communication services are considered a basic functionality in ATM switches to meet future multimedia applications. A common method to achieve multicast services is to add a point-to-point switch at the back of a copy network. However, overflow problems in the copy network may result in problems; for example, head-of-the-line blocking exists even when an output queuing switch is used, and unfair services are provided to different output port.

In a multimedia environment, many different traffic types are statistically multiplexed and ATM cells can have different priority levels. To achieve priority sorting functionality, an additional sorting network can be used in input queuing or shared queuing switches. However, the priority requirement may conflict with the basic architectural designs in output queuing switches. For example, in the Knockout switch described in U.S. Pat. No. 4,760,570 issued Jul. 26, 1988 to Acampora et al. the N-input/L-output concentrator cannot let some cells with higher priority go to their output cells.

It is thus advantageous to provide a core switch fabric and an output controller for a fast packet switching system that permits the integration of multicast services and priority control into the switch design while at the same time providing a design that can readily be expanded with a minimum level of complexity.

It is also advantageous to provide a core switch fabric and output port controller which utilize a self-routing architecture so as to eliminate any need for central controlling means.

Further, it is advantageous to provide a core switch fabric and output port controller which can process any number of cell priority levels up to the limitation imposed by the size of the cell priority fields.

These advantages are included amongst those provided by the subject invention.

SUMMARY OF INVENTION

In accordance with one aspect of the invention, there is provided a self-routing, modular, switching arrangement for distributing and concentrating data packets input thereto in an asynchronous transfer mode system wherein the data packets each comprise address information to identify one or more addresses 1 through N and priority information. The switching arrangement includes a distribution section comprising N distribution networks each having one input and N outputs wherein each of the inputs is linked to one or more outputs 1 through N associated therewith depending upon the address(es) of the data packet at the input. The switching arrangement also includes a concentration section comprising N priority concentration sorters each having N inputs and L outputs, L being less than N, wherein the sorters comprise means for ordering data packets input thereto according to the priority information in the data packets and for transferring to the outputs only the L data packets from the N inputs which have the highest relative priorities.

Preferably, the distribution section of the switching arrangement is of a radix-r tree configuration comprising a plurality of linked multicast elements each having one input link and a plurality of output links, the number of the output links depending upon the value of r, and wherein an extra cell header associated with each data packet comprises the address information for the data packet, the address information comprising data identifying the output links of the multicast elements to which the data packet is to be transferred. Each multicast element comprises means for processing the address information and transferring the data packet from the input of the multicast element to none, all or specified ones of the output links of the multicast element according to the address information. The length of the extra cell header may be variable and determined by the output links of the multicast elements to which the data packet is to be transferred, wherein the extra cell header excludes data identifying descendent output links to which the data packet is not transferred when the data packet is also not transferred to the ascendent output link(s) of the descendent output links. A multiplicity of the switching arrangements can be interconnected to form an expanded switching arrangement.

In accordance with a further aspect of the invention, an output port controller for multiplexing sets of L data packets input to the controller at successive time slots according to their relative priority levels and for producing as an output one data packet having a higher relative priority is provided. The controller comprises means for comparing the priority levels of the successive sets of input data packets, means for queuing the data packets received during time slots prior to the current time slot and means for outputting in each time slot one data packet of the sets of data packets having a higher relative priority. Preferably, the controller is of a loop configuration comprising multiple successive stages of the comparing means wherein the data packet having the highest relative priority in each stage but the first is output from the comparing means of such stage, looped back and input to the comparing means of the previous stage, wherein the first stage comparing means is the output of the controller.

In accordance with still a further aspect of the invention, a self-routing, N-input×N-output switching arrangement is provided. The switching arrangement comprises a self-routing, modular switching arrangement for distributing and concentrating data packets input thereto in an asynchronous transfer mode system wherein the data packets each comprise address information to identify one or more addresses 1 through N and priority information, comprising:

(i) an distribution section comprising N distribution networks each having one input and N outputs wherein each input is linked to one or more outputs 1 through N associated therewith depending upon the address(es) of the data packet at the input; and (ii) a concentration section comprising N priority concentration sorters each having N inputs and L outputs, L being less than N, wherein the sorters comprise means for ordering data packets inputs thereto according to the priority information in the data packets and for transferring to the outputs only the L data packets from the N inputs which have the highest relative priorities. The switching arrangement also comprises N output port controllers as described above, wherein the L outputs of each of the 1 to N priority concentration sorters is input to the 1 to N output port controllers, respectively. A multiplicity of the switch arrangements can be interconnected to from an expanded switching arrangement.

BRIEF DESCRIPTION OF THE DRAWINGS

FIG. 7(*a*) is a block diagram of a further exemplary distribution network of the switching arrangement of the present invention and FIG. 7(*b*) illustrates a variable length VIA extra cell feeder utilized for the distribution network of FIG. 7(*a*);

FIG. 8 is a block diagram of a basic concentrating unit of a priority concentrating sorter of the switching arrangement of FIG. 1;

DETAILED DESCRIPTION OF THE INVENTION

Figure 1:
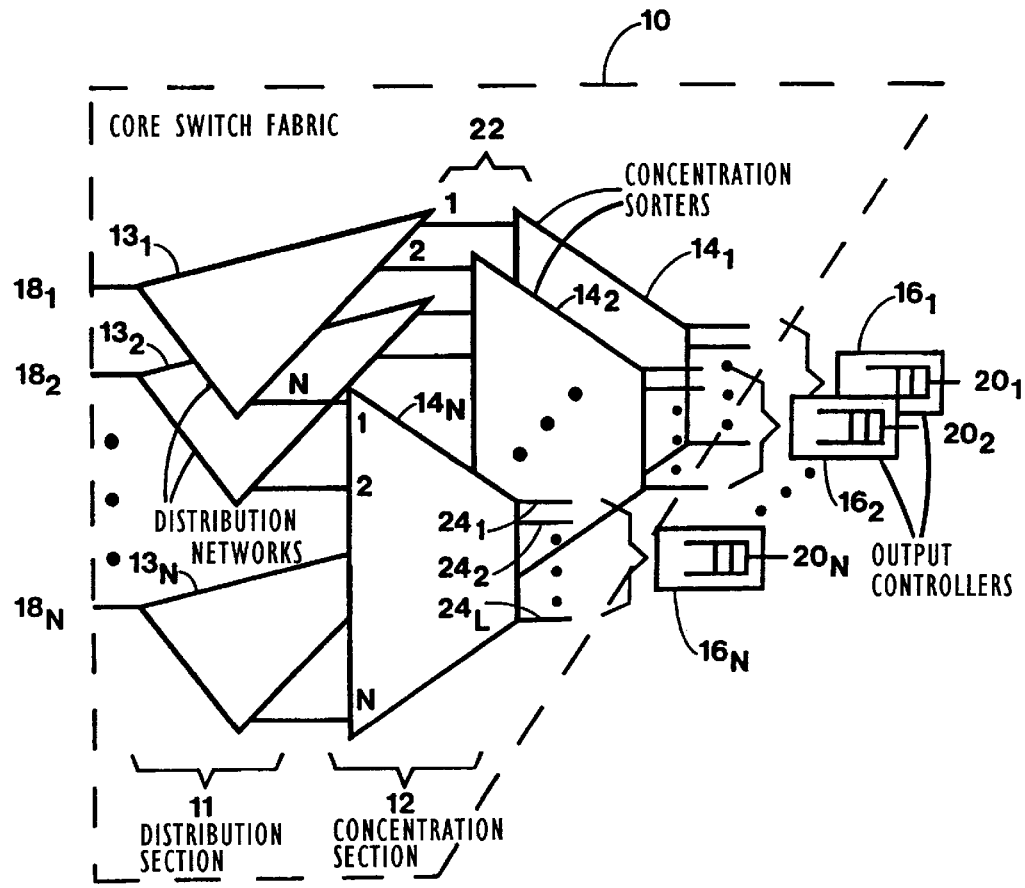
FIG. 1 is a block diagram of a switching arrangement in accordance with the present invention.

FIG. 1 illustrates the basic architecture of an N×N switching arrangement in accordance with the present invention. The N-input, N-output packet switch of the present invention has two primary aspects: a core switch fabric 10 and a row of output controllers $16_1$ to $16_N$. The core switch fabric 10 can be broken down into a distribution section 11 and a concentration section 12, which are preferably each packaged in a self-contained integrated circuit chip (when VLSI is used). As will be explained in greater detail below, the distribution section provides routing and multicasting functions for the core switch fabric 10 and the concentration section 12 provides priority sorting and concentration functions. The distribution section 11 of the core switch fabric 10 is comprised of a stack of N distribution networks $13_1$ to $13_N$. Each of the distribution networks $13_1$ to $13_N$ has a single input, $18_1$ to $18_N$, respectively, and each distribution network $13_1$ to $13_N$ has N outputs, such that the distribution section 11 has a grid of N×N outputs.

The concentration section 12 of the switch fabric 10 is made up of a row of N N-to-L priority concentration sorters $14_1$ to $14_N$. Each of the priority concentration sorters $14_1$ to $14_N$ has N inputs and L outputs, such that the concentration section 12 has a grid of N×N inputs and N×L outputs.

An N×N interconnection plane, indicated generally by 22, is provided between the distribution section 11 and the concentration section 12 of the core switch fabric 10. Each of the N outputs of an arbitrary distribution network $13_i$ (which is identical to all the other distribution networks) is connected to an input of a different concentration network $14_1$ to $14_N$ and each of the N inputs of an arbitrary priority concentration sorter $14_i$ is connected to an input of a different distribution network $13_1$ to $13_N$ such that a packet or cell arriving at the input $18_i$ to the distribution network $13_i$ has a potential path through the distribution network $13_i$ to a unique input of each of the priority concentrating sorters $14_1$ to $14_N$.

Preferably, all of the connecting links in the N×N connecting plane 22 do not cross over each other and are similar or identical in length so as to ensure that the propagation delay on each of the links is substantially the same for all cells which are transferred from the distribution section 11 to the concentration section 12.

The L outputs of each of the priority concentrating sorters $14_1$ to $14_N$ are connected to output port controllers $16_1$ to $16_N$, respectively. In the core switch fabric 10, every input port $18_1$ to $18_N$ has a distribution network $13_1$ to $13_N$, respectively, and every output port $20_1$ to $20_N$ has a priority concentrating sorter $14_1$ to $14_N$, respectively. In other words, a cell which is addressed for an output port $20_i$ must pass through the corresponding priority concentrating sorter $14_i$, however it can come from any of the inputs $18_1$ to $18_N$.

Packets or cells arrive at the N inputs $18_1$ to $18_N$ of the switch fabric 10 in a time-slotted manner. The arriving packets each include a packet header that includes an address field and a priority field. The address field, which will be discussed in greater detail below, indicates which of the output ports $20_1$ to $20_N$ the packet is destined for. In a multicast application, any particular packet could be addressed for simultaneous distribution to up to N different output ports. The priority field indicates the priority of the packet, which in a multi-media environment can vary depending on the service for which the packet payload is intended. The priority field can be used to divide the arriving packets into several service classes. The priority field may contain parameters indicating both loss priority and delay priority and include aging data that indicates how long the cell has been in the switch architecture. Although the switch fabric 10 can receive up to N cells in any given time slot, frequently the number of packets received simultaneously by the switch fabric 10 will be less than N.

The distribution networks $13_1$ to $13_N$ each are required to perform several basic functions including point-to-point routing, point-to-multipoint multicasting, group distribution and broadcasting. Preferably, the distribution networks can perform these functions in a single-pass manner, meaning that any cell which arrives at the input of a distribution network only has to travel through any point or node in the network a single time on its way to the outputs of the distribution network. The distribution networks $13_1$ to $13_N$ use a self-routing addressing scheme and decentralized control.

There are a number of different designs that can be used to implement the routing and multicasting functions of the distribution networks $13_1$ to $13_N$, however the preferred embodiment of the distribution networks is implemented using a radix-r tree network. Unlike other non-blocking copy network designs, the radix-r tree structure does not suffer from overflow problems, and thus provides fair and instant services to all arriving multicast cells. The value of r is determined by the fan-in and fan-out driving capacity of current technology. In the illustrated embodiments of the invention herein, a radix-r tree structure in which r=2 is used. However, this value for r is chosen herein only for purposes of simplicity, in that it permits a more readily understandable teaching of the invention, and a selection of r=2 is not preferred. To the contrary a selection of r=2 results in the longest length of cell header and, therefore, may not be appropriate for any particular application. In a preferred implementation of the invention, r is as large as possible as permitted by the current technology.

Figure 2:
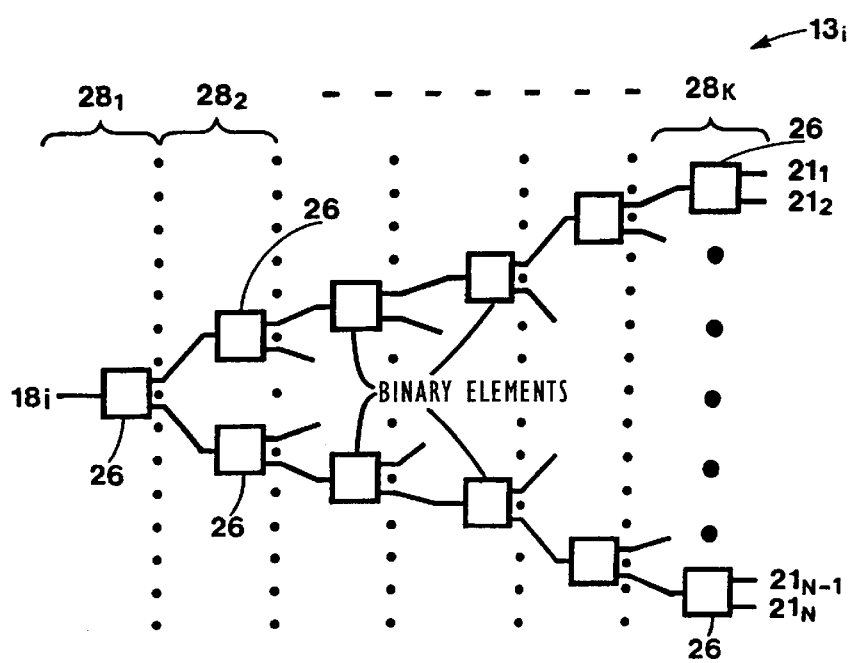
FIG. 2 is a block diagram of one of the N distribution networks of the switching arrangement of FIG. 1.

FIG. 2 shows a block diagram of the exemplary structure of an arbitrary distribution network $13_i$. The distribution network $13_i$ has a radix-r tree structure (where r=2) which is comprised of a plurality of multicast binary elements 26, the internal structure of which will be described in greater detail below.

Each multicast binary element 26 has one input link and two output links and is capable of selectively reproducing a cell appearing at its input at either one or both or neither of its outputs. The binary elements 26 are grouped in K stages $28_1$ to $28_K$, with each successive stage containing twice (r=2) the number of binary elements 26 of the previous stage. Each output link of any particular binary element 26 is attached to the input link of a different binary element 26 which is located in the successive stage. (Hereinafter, the term "ancestor" is used to refer to the binary element 26 from whence a cell came, and the term "descendent" refers to a binary element 26 to which a cell is sent. Thus, for example, the binary elements 26 in the 2nd stage $28_2$ are descendents of the binary element 26 in the 1st stage $28_1$, the binary element 26 in the 1st stage $28_1$ is the ancestor of the binary elements 26 in the 2nd stage $28_2$.) The final stage $28_K$ contains N/2 binary elements, thereby providing the N outputs $21_1$ to $21_N$ of the distribution network $13_i$. The total number of stages in a radix-r tree network is $\log_r N$ stages.

Figure 3:
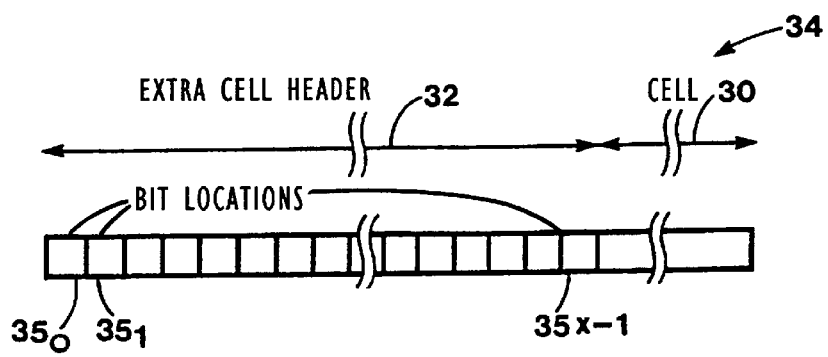
FIG. 3 illustrates a packet format for transmission through the switching arrangement of the present invention.

The distribution network $13_i$ is self-routing, meaning that each of the individual multicast binary elements 26 performs its function independently of the other binary elements 26 and without the influence of any central control means. In the preferred embodiment of the invention the routing of cells through the radix-r distribution network $13_i$ operates under what will be referred to as a Vertex Isolation Addressing (VIA) scheme, which requires fewer address bits to be passed through the core switch fabric than an explicit addressing scheme (in which all destination output addresses are provided explicitly in an extended cell header). Referring to FIG. 3, under the VIA scheme, any cells 34 which arrive in a time-slotted manner at the inputs $18_1$ to $18_N$ of core switch fabric 10 have been modified so that the cells 34 include an extra cell header 32 which contains the information required by the distribution networks $13_1$ to $13_N$ to perform their respective routing and multicasting functions. The extra cell header 32 includes X bits $35_0$ to $35_{x-1}$ of information.

Under one exemplary VIA scheme, the extra cell header 32 contains 2 bits of specific information for every multicast binary element 26 that is included in the arbitrary distribution network $13_i$. As the binary elements 26 each have two output links, an upper output link and a lower output link, the two bits intended for a specific binary element are used by that binary element to determine whether the cell it receives at its input should be reproduced at its upper output, its lower output, both outputs or neither. The selected binary element 26 performs this function in a simple manner; if the value of the first of the two bits is one, then the element 26 copies the input cell to its upper output, and if the value of the second bit is one, then it copies the input cell to its lower output. If a bit is zero, then the cell is not copied to the corresponding output.

In a manner that will be explained in greater detail below, each of the binary elements 26 is preconfigured so that it will reference two predetermined bit locations in the extra cell header 32 that are unique to that binary element 26. Preferably, the bit locations in the extra cell header 32 are designated for use by specific binary elements 26 in a sequential order based firstly on which of the K stages $28_1$ to $28_K$ a specific binary element 26 is located in and secondly, where the specific binary element 26 is located within its stage or level. Thus, for example, the binary element 26 in the first stage $28_1$ would be preconfigured to look at the bit locations $35_0$ and $35_1$ in the extra cell header 32 for the routing information that applied to it. The top binary element of the two binary elements 26 in the second stage $28_2$ would be preconfigured to look at the bit locations $35_2$ and $35_3$ for the routing information that applied to it. The bottom binary element of the two binary elements 26 in the second stage $28_2$ would be preconfigured to look at the bit locations $35_4$ and $35_5$ for the routing information that applied to it.

Each binary element 26 in the distribution network $13_i$ is effectively assigned two unique bits in the extra cell header 32. The manner in which the bit locations are assigned to a specific binary element 26 can be further explained as follows, with reference to an example provided in FIG. 4. In a radix-r tree network, the position of a particular radix-r element can be described by a pair of numbers, say (i,j), where:

i represents the stage (or level) in which the particular element is located, i=0,1, . . . ,$\log_r N-1$; and j represents a vertex index counting the elements in the stage i from top to bottom, j=0,1, . . . , $r^{j-1}$.

As an example, for a binary element 26(i,j) (r=2), the bit locations in the extra cell header 32 which pertain to that binary element can be determined according to the following equation:

$$\{b(i,j)_0, b(i,j)_1\} = \{2^{i+1}+2j-2+\text{offset}, 2^{i+1}+2j-1+\text{offset}\}$$

where:

$b(i,j)_0$=the bit location of the binary information pertaining to the upper output of the binary element 26(i,j);

$b(i,j)_1$=the bit location of the binary information pertaining to the lower output of the binary element 26(i,j); and offset=the number of bits located ahead of the first bit 350 of the extra cell header 32 (these bits could include such things as a validity bit; for the current explanation, the offset is assumed to be 0).

It will thus be appreciated that under the VIA scheme, any particular multicast element 26 only has to examine two pre-determined bit locations in the extra cell header 32.

Figure 4:
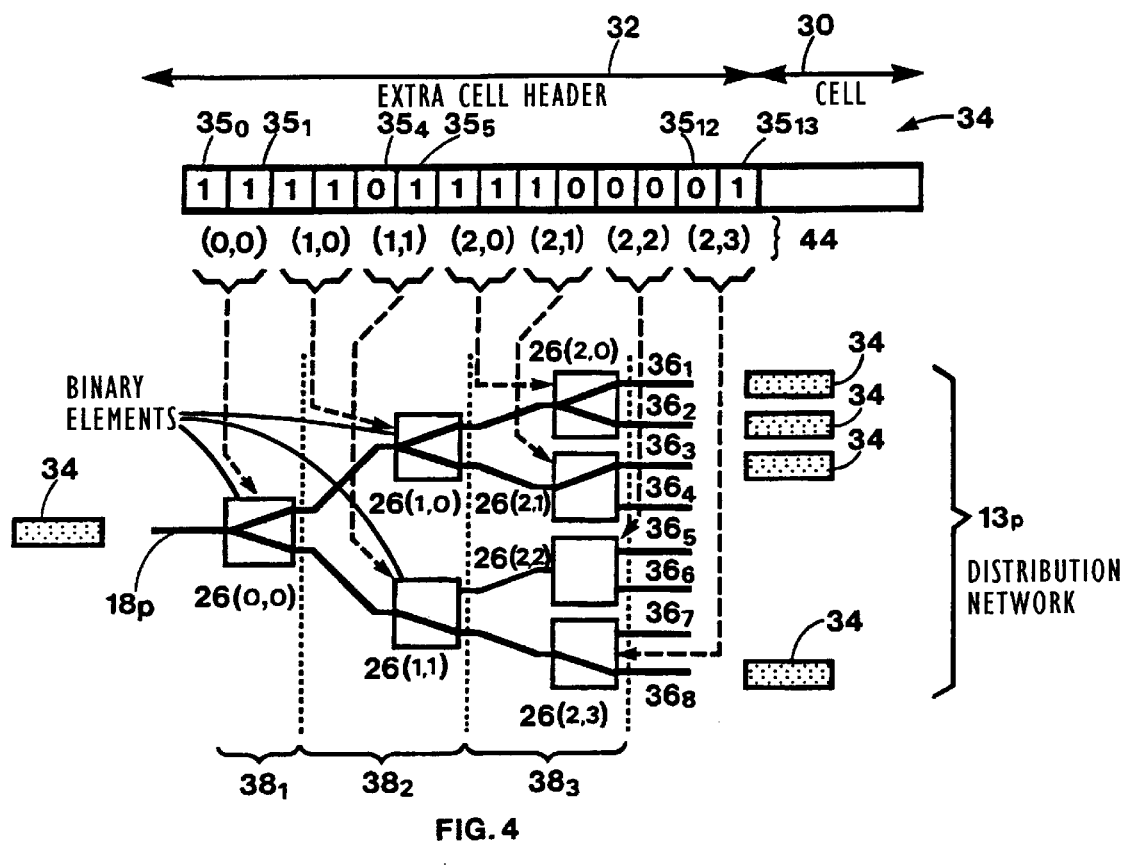
FIG. 4 is a block diagram of an exemplary distribution network of the switching arrangement of FIG. 1.

In order to further explain the operation of the VIA scheme, an exemplary distribution network $13_p$ is shown in FIG. 4. The distribution network $13_p$ is part of an N×N packet switch in which N=8 and has 8 outputs $36_1$ to $36_8$. A cell 34 contains information in its address field indicating that the cell 34 is to be multicast to four different output ports of the switch. The four output ports are associated with the outputs $36_1$, $36_2$, $36_3$ and $36_8$, respectively, of the distribution network $13_p$. In accordance with the VIA scheme, the extra cell header 32 contains 2 bits of information for each of the multicast binary elements 26(i,j) (where i=0,1, or 2 and j=0,1,2 or 3). The bit information, which is contained in bit locations $35_0$ to $35_{13}$ includes the information required by each of the binary elements 26(i,j) to route and multicast the modified ATM cell 34 to the four outputs $36_1$, $36_2$, $36_3$ and $36_8$.

Referring to FIG. 4, it will be noted that the value of i for each binary element 26(i,j), corresponds to the stage in which the binary element 26(i,j) is located. For example, the value of i for the binary element 26(0,0), which is located in the first stage $38_1$, is i=0, and the value of i for the binary elements 26(1,0) and 26(1,1) which are located in the second stage of $38_2$ of the distribution network $13_p$, is i=1. For the binary element located in the third stage $38_3$, i=2. Additionally, it will be noted that the value of j corresponds to the vertical location of a particular binary element 26(i,j) within a stage. Thus, the value of j for the binary element 26(2,0), which is the top element in the last stage $38_3$ of the distribution network, is j=0, and the value of j for the binary element 26(2,3), which is the bottom or 4th element in the last stage $38_3$ is j=3. Using the bit address equations stated above the bit location $35_0$ to $35_{13}$ within the extra cell header 46 which correspond to a particular binary element 26(i,j) can easily be determined. For example, the first binary element 26(0,0) is pre-programmed to look at bit locations $b(0,0)_0$ and $b(0,0)_1$. Using the equations provided above, it can be determined that $b(0,0)_0=0$ and $b(0,0)_1=1$. Thus, the binary element 26(0,0) looks at the bit locations $35_0$ and $35_1$, which contain a "1" and a "1" respectively. As a result, the cell 34 which appeared at the input $18_p$ of the binary element 26(0,0) is reproduced at both the upper and lower outputs of the binary element 26(0,0), as illustrated by the bold lines in the binary element 26(0,0). The cell 34 is then transmitted by a connecting link to the input of each of the binary elements 26(1,0) and 26(1,1) in the second stage $38_2$ of the distribution network $13_p$, as illustrated by the bold lines interconnecting binary element 26(0,0) to the binary element 26(1,0) and 26(1,1). The binary elements 26(1,0) and 26(1,1) then continue the process by each looking in the extra cell header 32 for the bits which pertain to them. For example, the binary element 26(1,1) will, in accordance with the above equations, look at bit locations $35_4$ and $35_5$, which contain a "0" and a "1" respectively. Based on this information, the binary element 26(1,1) reproduces the cell 34 at its lower output but not its upper output. From the above description it will be appreciated that the bit locations $35_0$ to $35_{13}$ as shown in FIG. 4 contain the information required to route and multicast the modified cell 34 to the 4 designated outputs $36_1$, $36_2$, $36_3$ and $36_8$. For added clarity, the row of paired numbers indicated by the number 44 indicate the (i,j) coordinates of the binary elements for which the bits contained in the extra cell header 32 are directed towards.

The operation of the VIA scheme requires the generation of the extra cell header 32. In order to derive the extra cell header 32, the original address information contained in the cell must be interpreted and modified before the cell can be sent through the distribution network 13. This encoding function can be done at the end user, at the network interface, or at the switch itself depending on the network topology. Referring to the example illustrated in FIG. 4, the original addressing information contained in the address field of the packet 34 contained information stating that the packet should be routed to switch outputs which correspond to the outputs $36_1$, $36_2$, $36_3$ and $36_8$ of the distribution network $13_p$. In binary form, the addresses for the outputs of the distribution network $13_p$ would be as follows: $36_1$=000; $36_2$=001; $36_3$=010; $36_4$=011; $36_5$=100; $36_6$=101; $36_7$=110; $36_8$=111. Thus, the original address information would indicate that the cell 34 was destined for the output set $\{(000)_2, (001)_2, (010)_2$ and $(111)_2\}$. This information must be used to set the bit numbers $35_0$, $35_1$, $35_2$, $35_3$, $35_5$, $35_6$, $35_7$, $35_8$ and $35_{13}$ of the extra cell header 32 to 1 (and keep the other bits as zeros). The simplest way to perform this mapping function is to use a look-up table, however the table must be large enough to handle $2^N-1$ entries in order to cover all possible permutations.

Preferably, software is used to implement a simple algorithm for encoding an original address into a suitable VIA address. In the preferred algorithm, the original address of a destination port is denoted as the binary numbers $(A[0], A[1], A[2], \ldots, A[\log_2 N-1])_2$. The bit locations in the extra cell header 32 which are to be set to ones to indicate the base output address $(0,0,0 \ldots, 0)_2$ are defined as base bit set $C=\{C[0], C[1], C[2], \ldots, C[\log_2 N-1]\}$. The bit locations in the extra cell header 32 which are to be set to ones for the arbitrary output address $(i)_{10} \equiv (A[0], A[1], A[2], \ldots, A[\log_2 N-1])_2$ are defined as $Di=\{d[0], d[1], d[2], \ldots d[\log_2 N-1]\}$, and $d[k]$ is the corresponding bit location to the value given by $(a[0], a[1], \ldots, a[k])_2$. In order to find the members in set C, it suffices to use the equation $c[k]=\Sigma^k_{L=0} 2^L-1$. To find all members in the set: $Di=\{d[k] | (i)_{10} \equiv (a[0], a[1], a[2], \ldots, a[\log_2 N-1])_2, 0 \leq K \leq \log_2 N-1\}$ the following equations are used:

$$c[k]=c[k-1]+2^k \text{ with } c[-1]=-1; \text{ and} \quad (1)$$

$$d[k]=c[k]+\Sigma^k_{L=0} a[1] 2^{k-L} \quad (2)$$

As the values of the set C are fixed, they can be precalculated and stored in $\log_2 N$ registers, and for a given i, the member of a set Di can then be calculated using the equation (2) listed above. The equation (2) can be executed with shift and addition operations and does not require the use of a multiplier for calculation.

Figure 5:
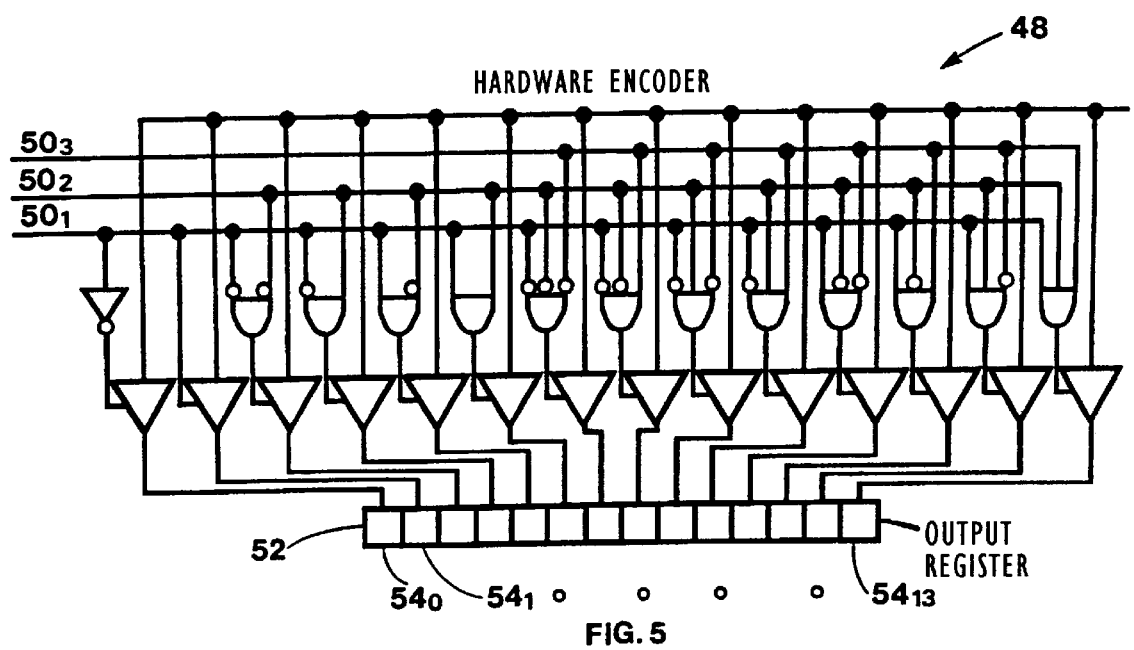
FIG. 5 is schematic of an exemplary address encoder.

Although the above algorithm can be used to encode a binary output address into the VIA extra cell header 32 by using software, the encoding operation can alternatively be performed by a hardware encoder. FIG. 5 shows an exemplary hardware encoder 48 constructed from simple logic gates which can be used to encode the binary address of an output for the exemplary distribution network $13_p$ in which N=8. In operation, the three-bit binary original address of a designated output $36_1$ to $36_8$ is input to the encoder 48 over three input lines $50_1$, $50_2$ and $50_3$, with the most significant bit being input on line $50_1$. The logic gates translate the inputs to set the appropriate bits to one in an output register 52 which contains 14 bit locations $54_0$ to $54_{13}$. Once all of the output ports addresses associated with a particular packet have been encoded, the register 52 is output as an extra cell header 32. Additionally, a hardware encoder could easily be constructed using a PROM or a PLA device.

Figure 6:
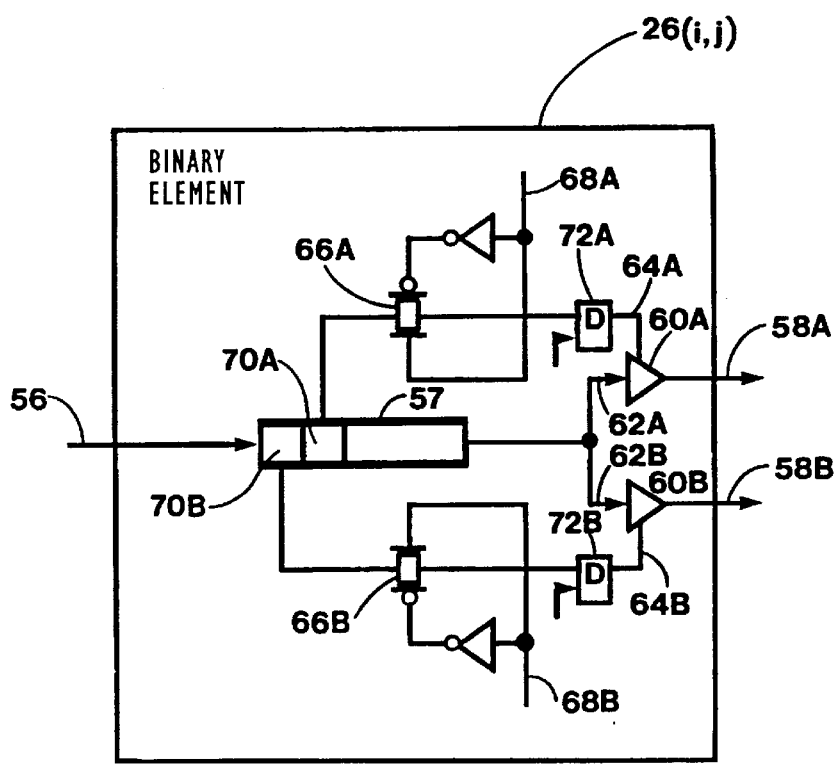
FIG. 6 is a schematic of a binary multicast element of the distribution network of FIG. 2.

Each binary element 26(i,j) in a distribution network is capable of decoding the extra cell header 32 and interpreting the two appropriate bits. FIG. 6 shows a simplified schematic of the preferred structure of an arbitrary binary element 26(i,j). As explained previously, the binary element 26(i,j) includes an input 56 and an upper output link 58A and a lower output link 58B. The upper output link 58A is the output terminal of an upper copy element 60A and the lower output link 58B is the output terminal of a lower copy element 60B. The inputs 62A and 62B of the copy elements 60A and 60B are attached to the output of a register 57. The copy elements 60A and 60B each have a control terminal 64A and 64B. When the control terminal of a copy element 60A or 60B is active, the copy element will copy the information placed at its input to its output. The control terminals 64A and 64B are connected to delay-type latches 72A and 72B, respectively. During operation, the packet 34 of FIG. 3 is input one bit at a time into the register 57, starting with bit $35_0$. At a predetermined point in time after the element 26(i,j) begins receiving the extra cell header 32, the bit pair which is allocated to that element will appear at two successive bit memory locations 70A and 70B in the register 57. At that point in time, the transmission gates 66A and 66B are probed by preconfigured counter clock signals through the connections 68A and 68B. This causes the bits located in the location 70A and 70B to be interrogated, and if the bit in location 70A is a "one", the control input 64A of the copy element 60A is activated, and if the bit located in location 70B is a "one", the control input 64B of the copy element 60B is activated. Thus, if the bits located in 70A and/or 70B are high during the correct predetermined time interval, the respective copy element 60A and/or 60B will cause the cell 34 to be reproduced at its output. Once activated, the control terminals 64A or 64B remain high by the latches 72A and 72B until the reproduction of the cell 34 is complete.

Although not shown in the binary element 26(i,j) of FIG. 6, the binary element could include additional circuitry to provide for error detection. This can be accomplished by having a descendent binary element 26 check in the extra cell header 32 the bits intended for its ancestor binary element 26. By doing so, the descendent binary element 26 will be able to determine if the cell 34 should have been provided to it.

In the VIA scheme described above, the length of the extra cell header 32 is equal to $(r/(r-1))(N-1)$. In a time slotted system, the duration of a slot is equal to the transmission time of a normal cell. Under the VIA scheme, the distribution networks $13_1$ to $13_N$ must have an internal speedup factor in order to deliver the extra bits that are contained in the extra cell header 32 within a given time slot.

For large distribution networks, it is possible to further reduce the length of the extra cell header 32 by using a further embodiment of the VIA scheme in which the length of the extra cell header 32 varies in accordance with the route taken by a cell through a distribution network $13_i$. In the regular VIA scheme discussed above, a zero value in a bit location read by a binary element 26 means that no cells will be transferred on that output link to descendent cells. When a "one" is located in a bit location, it indicates that the cell will be transferred on an output link to descendent cells. A series of linked binary elements can be considered a "linked list". When a particular cell is destined for only a few output ports, most of the bits in the extra cell header 32 will be zeros. The variable length VIA scheme gets rid of unnecessary zero bits by truncating those zero bits which belong to the descendants of a link in which a zero bit has already been encountered by an ancestor. In other words, the extra cell header 32 is shortened so that it does not include reserved bit locations for binary elements 26(i,j) that the cell will never pass through.

FIG. 7 shows an example of the variable length VIA scheme for an exemplary distribution network 75 for which N=8. A cell which includes an extra cell header 73 is input into the network 75. The extra cell header 73 contains, in accordance with the variable length VIA scheme, the information required to copy the input cell to the 1st and 8th outputs of the distribution network 75 (as illustrated by the bold lines). The bits indicated by the numbers $79_1$, $79_2$ and $79_3$ are the bits that are intended for the binary elements $26_{(i,j)}$ contained in the stages $77_1$ $77_2$ and $77_3$, respectively. The zero bits indicated by 81 are the end of a particular linked list of binary elements, and the cell header does not include any bit information for the elements $26_{(2,2)}$ and $26_{(2,3)}$ as they are not included in any linked lists. Thus, the length of the extra cell header 73 is four bits shorter than it would be under the conventional VIA scheme discussed above.

In order to encode the variable length VIA header, a software algorithm can be used that creates a normal fixed length VIA header, and then scans that header, detects any bits corresponding to unused descendent binary elements and deletes them from the header. The following algorithms can be used to perform such a function:

(i) Encoding Method 1 (for r=2):
Construct a regular VIA cell header For i=$\log_2$N−1 to 1
For j=0 to $2^i$−1
If b(i−1⌊j/2⌋)$_x$=0 and b(i,j)$_0$=0 and b(i,j)$_1$=0, then the two bit locations of vertex (i,j) are dropped from the regular VIA cell header, where x=0 if j is even; or x=1 if j is odd This encoding method involves checking the ancestor bit before a redundant descendant bit is removed.

(ii) Encoding Method 2:
Construct a regular VIA cell header.
Partition the VIA cell header into r-bit windows, each window representing the output link activities of a radix-r multicast element. If all bits in the same window are equal to zero, these r bits are not included in the variable length VIA cell header.

This encoding method does not check the ancestor bit but is simpler to implement.

In order to decode a variable length VIA header at a binary element $26_{(i,j)}$, a certain amount of computational power is required in the binary element. The binary element searches an incoming variable length VIA cell header from the first relevant bit location, and when a zero is found the branch under the control of that zero bit should be pruned, a branch being a sub-tree network in which all multicast elements are descendents of a particular multicast element. For example, in the network 75 the elements 26(1,0), 26(2,0) and 26(2,1) constitute one of the two branches coming out from the element 26(0,0). Pruning a branch involves removing the bit locations in the VIA cell header 32 which are in a single branch. In the variable length VIA scheme a branch is pruned when the link connecting an ancestor element and its immediate descendent has a value of "0". For example, in the network 75 the lower link of element 26(1,0) is equal to zero so the branch coming out of this link is pruned and the bit locations of element 26(2,2) in the regular VIA cell header are removed.

The following is a decoding algorithm for variable length VIA:

For (i,j) binary element, set up a list $\mathcal{L}_i$ being the set of lexicographical ordered binary elements up to level i For h=0 to i
For k=0 to $2^h$−1
If (h,k) vertex is pruned previously then stop
If b(h,k)$_{,0}$=0, prune the whole branch in list $\mathcal{L}_i$ starting from vertex (h+1,2k) to level i which includes (h+x, y) where x=1 to i−h and $2^x k \leq y < 2^x k + 2x − 1$; if (i,j) is dropped, stop $\mathcal{L}_i$ if b$_{(h,k),1}$=0, prune the whole branch in list starting from vertex (h+1,2k+1) to level i, which includes (h+x,y) where x=1 to i−h and $2^x k + 2^{x-1} \leq y < 2^x k + 2^x$; if (i,j) is dropped, stop If label (i,j) is pruned, do nothing. If it is still in list $\mathcal{L}_1$, let a be the number of labels preceding to label (i,j); the corresponding check bit locations for vertex (i,j) are {2a+offset,2a+1+offset}.

Although in the preferred embodiment of the invention N radix-r networks functioning under the VIA scheme described above are used to implement the distribution section 11 of the switch fabric 10 of the present invention, the distribution networks $13_1$ to $13_N$ could be implemented using other well known techniques. For example, as is well known in the art, a broadcast-tree structure that employs back end cell-filtering could be used for each of the distribution networks $13_1$ to $13_N$. The hardware could also be substantially simplified by employing optical implementations with a cell-filter approach. Additionally, it may be possible to use an optical back plane with smart pixel arrays, a miniature cylindrical lens system, or fibre splitters to implement the distribution section 11.

Referring again to FIG. 1, packets or cells are continually arriving at the inputs $18_1$ to $18_N$ of the core switch fabric 10 of the invention and routed to one or more of the priority concentrating sorters $14_1$ to $14_N$. In any given time slot up to N cells may arrive which are ultimately destined for the same output port, and the function of the priority concentrating sorters $14_1$ to $14_N$ is to select the L cells having the highest priority and output those cells to an output port controller. In order to accomplish this task, the priority concentrating sorters $14_1$ to $14_N$, perform two functions: concentration and priority sorting.

Referring to FIG. 8, a unit 74 of an arbitrary priority concentrating sorter $14_i$ of the invention is shown. The unit 74 has 2L inputs, $80A_1$ to $80A_L$ and $80B_1$ to $80B_L$, and L outputs, $82_1$ to $82_L$. It is effectively a 2L to L concentrator. In a given time slot, the unit 74 receives up to 2L cells or packets at its 2L inputs, sorts the cells based on priority information contained in the priority fields of the cells, and outputs a column of up to L cells, in order of descending priority. (The cell with the highest priority will be output on line $82_1$, and cells of descending priority will be placed in descending order on the remaining output lines.) If more than L cells arrive at the 2L inputs of the unit 74 within a given time slot, only the L cells with higher priority will be provided to the output ports $82_1$ to $82_L$ and the remaining cells will be discarded.

The basic unit 74 is comprised of two L-input bitonic sorters 76A and 76B and a 2L to L priority concentrating merger 78. The bitonic L-sorters 76A and 76B are identical, and they each output in order of descending priority a column of cells at their outputs $84A_1$ to $84A_L$ and $84B_1$ to $84B_L$, respectively. The sorted outputs of the two bitonic sorters 76A and 76B act as the 2L inputs to the priority merging device 78, which then merges the two sorted sequences into one sorted sequence based on the priority of the cells.

Figure 9:
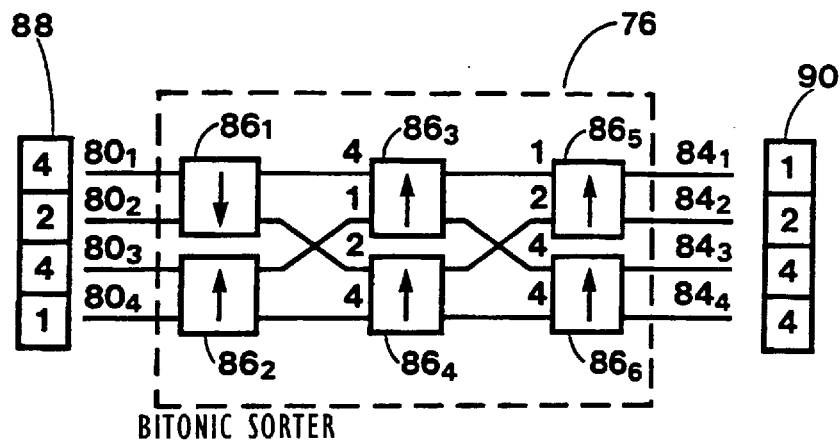
FIG. 9 is a block diagram of an exemplary bitonic sorter of the concentrating unit of FIG. 8.

The bitonic L-sorters 76A and 76B can be implemented using Batcher's bitonic method (see K. Batcher, "Sorting Networks And Their Applications", Proc.AFIPS—Spring Joint Computer Conference, Vol. 32, pp. 307–314, 1968). FIG. 9 shows an exemplary Batcher's bitonic sorter 76 including four inputs $80_1$ to $80_4$ and four outputs $84_1$ to $84_4$. The 4-input bitonic sorter 76 is implemented with three stages of sorting elements. The sorting elements $86_1$ to $86_6$ are conventional 2×2 comparators which compare the priority fields of the two cells placed at their inputs, and route he cells to the appropriate output based on the priority data. In FIG. 9, the arrows contained in each of the sorting elements $86_1$ to $86_6$ indicate which output the winning cell (i.e. the cell with the highest priority level) is sent to. As shown, the sorting element $86_1$ places the cell with the highest priority on its lower output line and the lower priority cell on its upper output line, whereas the other sorting elements $86_2$ to $86_6$ all place winning cells on the upper output and the losing cell on the lower output line. The configuration of the sorting elements $86_1$ to $86_6$ in the sorter 76 is such that four cells arriving in random order of priority at the inputs $80_1$ to $80_4$ will be sorted and output in descending order of priority at the outputs $84_1$ to $84_4$. By way of example, the column of numbers 88 represents four different cells arriving at the four inputs $80_1$ to $80_4$ of the sorter 76. The magnitude of numbers indicates the priority of cells, with one being the highest priority. The final output of the sorter 76 is shown in column 90, with the cells arranged in order of priority.

Referring again to FIG. 8, the concentrating merger 78 is presented with a priority sequenced list of cells from the sorter 76A and another list of priority sequenced cells from the sorter 76B for a total of 2L inputs. The concentrating merger 78 merges these two monotonically sorted lists, selects the L cells having the highest priority, and discards any remaining cells. The priority concentrating merger 78 can be implemented by modifying the odd-even merge (see F. T. Leighton, "Introduction to Parallel Algorithms and Architectures: Arrays, Trees, Hypercubes", San Mateo, Calif.: Morgan Kauffman Publishers, 1992).

Figure 10:
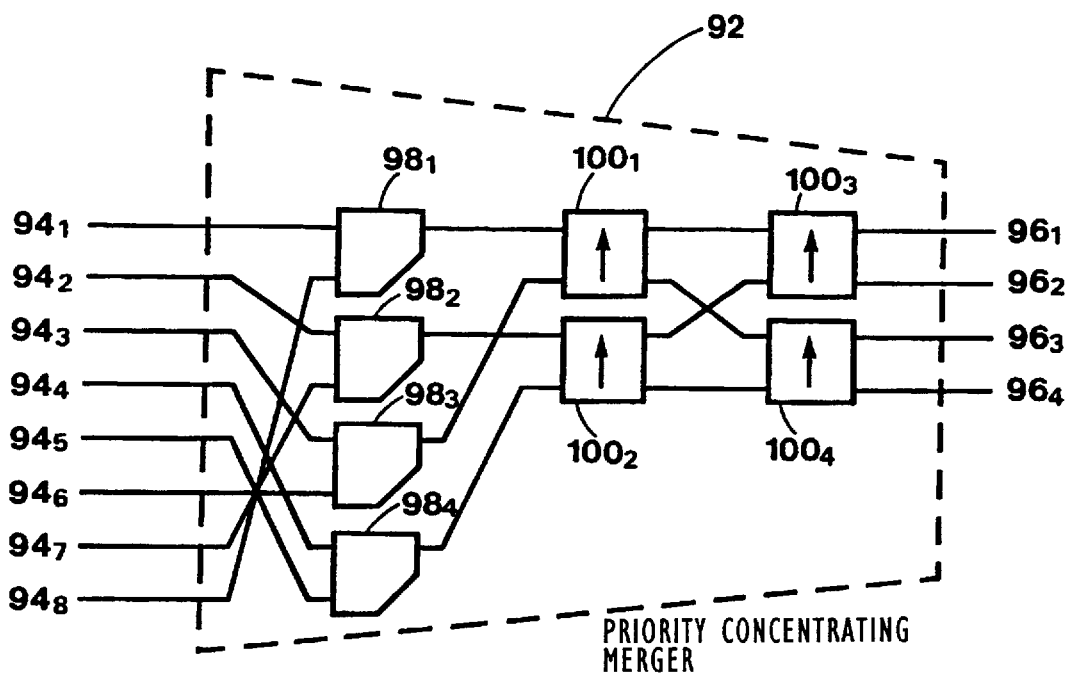
FIG. 10 is a block diagram of an exemplary concentrating merger of the concentrating unit of FIG. 8.

An exemplary 8 to 4 priority concentrating merger 92 is shown in FIG. 10. The concentrating merger 92 includes eight inputs $94_1$ to $94_8$. The top four inputs $94_1$ to $94_4$ receive a sequence of priority sorted cells from a four-input sorter such as the sorter 76 and the bottom four inputs $94_5$ to $94_8$ receive a different sequence of priority sorted cells from a different four-input sorter 76. The concentrating merger 92 merges the two sorted sequences into one sorted sequence based on the priority of the cells. The merger 92 includes an initial stage of comparator merging elements $98_1$ to $98_4$. The comparator merging elements $98_1$ to $98_4$ each have two input terminals and one output terminal (the merging elements may be 2×2 conventional comparator elements in which the losing output is simply discarded). The merging elements $98_1$ to $98_4$ each compare the priority fields of the cells placed at their inputs and place the winning cell, (the one with the higher priority), at its output. The losing cells are discarded. In the case of a tie, either cell may be arbitrarily declared a winner, with the choice depending on how the elements $98_1$ to $98_4$ are configured. The merger 92 inputs $94_1$ to $94_8$ are connected to the inputs of the elements $98_1$ to $98_4$ in such a manner that the highest priority cell in one sequence competes with the lowest priority cell in the other sequence. The cell with the second highest priority in the first sequence is compared against the second lowest priority in the second sequence, and so on with the result that the four cells with the overall highest priority from both sequences are output by the elements $98_1$ to $98_4$. The winning cells are then processed through two stages of 2×2 comparator sorting elements ($100_1$–$100_4$), which ensures that the cells are sorted into descending order of priority when they emerge at the output terminals $96_1$ to $96_4$ of the concentrating merger 92. The binary sorting elements and the binary merging elements can be implemented using dynamic logic (see "IC-MOS Batcher and Banyan Chip Set for B-ISDN Packet Switching", IEEE J. Solid-State Circuits, Vol. 25, No 6, pp. 1426–1432, DEC. 1990.)

Figure 11:
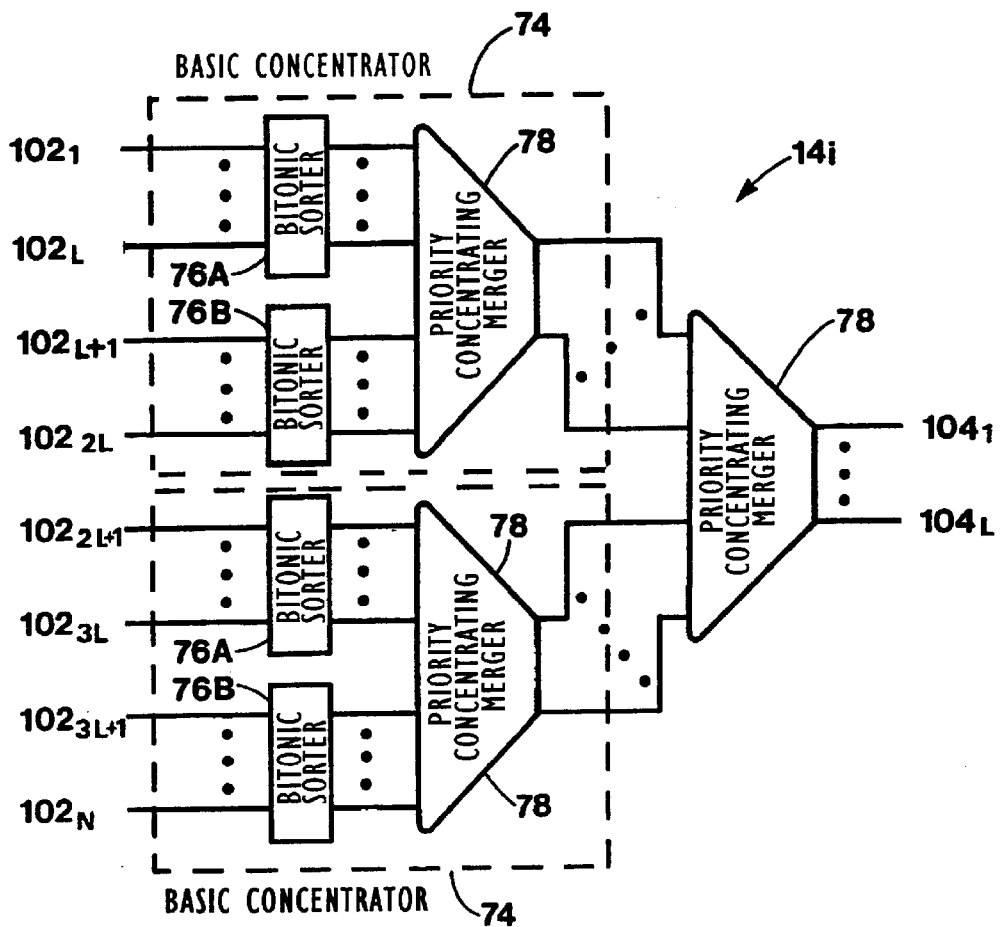
FIG. 11 is a block diagram of one of the N-to-L priority concentrating sorters of the switching arrangement of FIG. 1.

From the above explanation, it will be appreciated that the concentrating unit 74 functions as a 2L to L concentrator in which only the cells of the lowest priority, if any, are dropped. In the core switch fabric 10, the number of inputs N in a given concentrator sorter $14_i$ is generally much larger than the number of outputs L, and in any case N will generally be more than twice the number of L. The concentrator unit 74 can easily be combined with other concentrator units 74 and a concentrating merger 78 to form a priority concentrating sorter $14_i$ in which N is much greater than L. For example, FIG. 11 illustrates an exemplary N to L concentrating sorter $14_i$ in which N equals 4L. The concentrating sorter $14_i$ includes N inputs $102_1$ to $102_N$ and L outputs $104_1$ to $104$ The first 2L inputs $102_1$ to $102_{2L}$ lead to a first 2L to L basic concentrating unit 74, and the next 2L inputs $102_{2L+1}$ to $102_N$ lead to a second 2L to L basic concentrating unit 74. As will be understood from the above description, each concentrating unit 74 produces a sorted column of cells at its L outputs. The concentrating sorter $14_i$ includes a further concentration merger 78 to merge the two sorted sequences from the concentrating units 74 into one sorted sequence of L cells based on the priority of the cells.

If desired, two of the concentration sorters $14_i$ shown in FIG. 11 could be further combined together with an additional 2L to L concentration merger 78 to form an 8L to L concentration sorter. Thus, only two basic components are required to construct each of the N to L priority concentrating sorters $14_1$ to $14_N$ namely, an L-sorter 76A (or 76B) and a 2L to L priority concentrating merger 78.

Based on the construction discussed above, the N to L priority concentrating sorters $14_1$ to $14_N$ preserve a desired minimum global information, the L higher priority cells, throughout the whole switching plane. As the two basic building components, the L-sorter and the 2L to L priority concentrating merger, are small and easily constructed, the priority concentrating sorter $14_i$ facilitates the concept of modularity and scaleability. The modular structure of the distribution section 11 and the concentration section 12 of the core switch fabric 10 of the present invention permits the switch fabric 10 to be incrementally augmented to accommodate a desired switch dimension.

Figure 12:
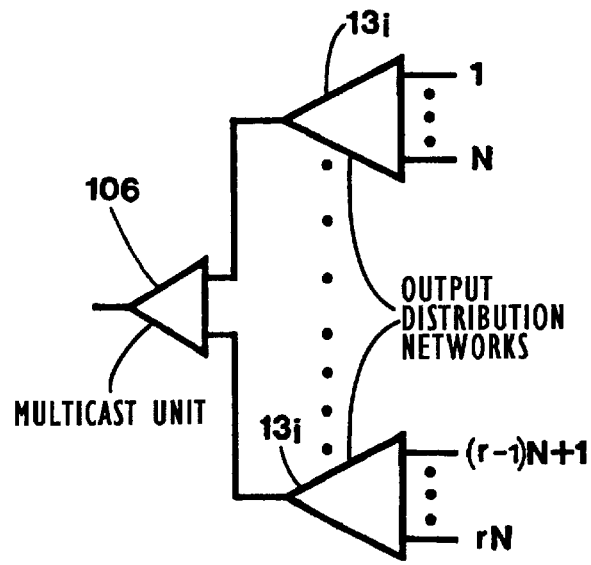
FIG. 12 is a block diagram of an expanded distribution network.

Referring to FIG. 12, an additional 1-to-r multicast unit 106 can be appended to the front of r N-output distribution networks $13_i$ to form an rN-output distribution network.

The simple augmentation methods used to expand the distribution network $13_i$ and a priority concentrating merger $14_i$ can also be used to build up the core switch fabric 10 in a similar fashion.

Figure 13:
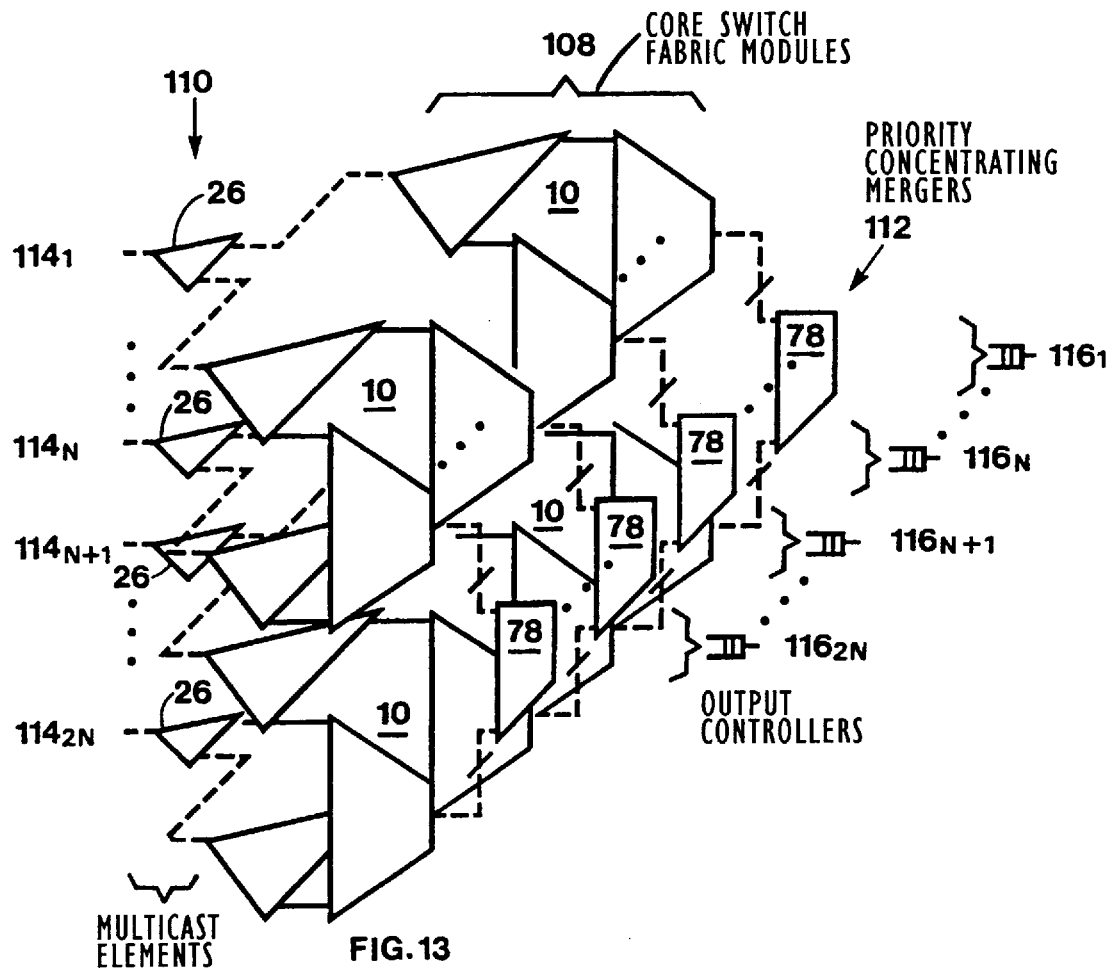
FIG. 13 is a block diagram of an exemplary expanded core switch fabric.

Referring to FIG. 13, a 2N-input switch according to the present invention is comprised of four N-input core switch fabric modules 10, indicated generally by 108. An additional column of 1 to 2 binary multicast elements 26 (r=2), indicated generally by 110 are added to the front of the switch fabric modules 10 to provide 2N output distribution networks, and an additional row of 2L to L priority concentrating mergers 78, indicated generally by 112, are added to the back of the switch fabric modules 10 to provide 2N to L priority concentrating sorters.

The core switch fabric 10 is most easily implemented using three dimensional packaging techniques in which the distribution networks are orthogonal to the priority concentrating sorters as shown in FIG. 1. In a three dimensional configuration, there will be no cross wirings between basic building modules and all interconnecting wires can be arranged in parallel between the basic building blocks. Thus, there is no delay discrepancy in transmitting signals between modules, which alleviates synchronization problems.

The distribution networks $13_1$ to $13_N$ provide every input with a non-overlapping direct path to every output so that no blocking or contention may occur within the distribution section 11.

From the above description, it will be understood that the core switch fabric 10 of the present invention receives up to N input packets in a given time slot and subsequently outputs up to N columns of up to L packets. The packets contained in a single output column are all addressed to the same destination output port and are in order of descending priority. In order to place the up to L packets in an output column on a single output line, it is necessary to multiplex the L packets together. This function will typically be performed by an output port controller 16 (FIG. 1) that has output port queuing and multiplexing capabilities. Any number of known devices can be used as an output port controller for the core switch fabric 10. For example, one possible output port controller construction is the shared buffer output that is used with the Knockout switch disclosed in U.S. Pat. No. 4,760,570 to Acampora et al. issued Jul. 26, 1988. Alternatively, an L-input, 1-output Star Burst switch architecture could be used as an output port controller (see U.S. Pat. No. 5,274,642 bto Widjaja et al. issued Dec. 28, 1993).

Figure 14:
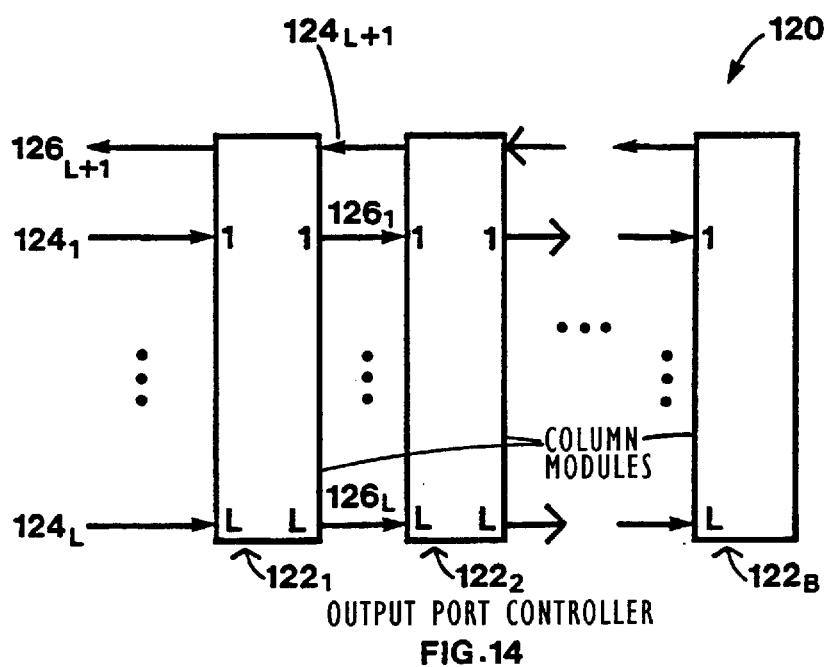
FIG. 14 is a block diagram of a simple form of embodiment of the output port controller of the switching arrangement of FIG. 1.

FIG. 14 is a block diagram of a simple form of output port controller 120 in accordance with a further aspect of the invention. The output port controller 120 can be used with the core switch fabric 10 of the present invention, or it can be used as an output port controller with other switch architectures, including switches where the L outputs are not presented as a sequence sorted according to priority. The basic architecture of the output controller 120 is that of a loop controller. In the embodiment of FIG. 14, the loop controller 120 is comprised of B serially connected column modules 1221 to $122_B$. Each column module has L+1 inputs $124_1$ to $124_{L+1}$, L of which are located on the left side of the column module and one of which is located on the right side. Each column module also has L+1 outputs $126_1$ to $126_{L+1}$, L of which are located on the right side of the column module and one of which is located on the left side. Each column module is able to accept L+1 cells in a time slot and deliver one "winning" cell in the left direction and L "losing" cells in the right direction. The losing cells of the Bth column module $122_B$ are discarded, so the number B of columns is selected to meet a desired loss probability. The determination of whether a cell is a winning cell or a losing cell is based on information contained in the priority field of the cell header. The priority field includes a priority level, the cell sequence number and/or a time stamp. Different internal designs for the column modules can lead to different functionalities and different queuing disciplines of the overall loop controller 120.

Figure 15:
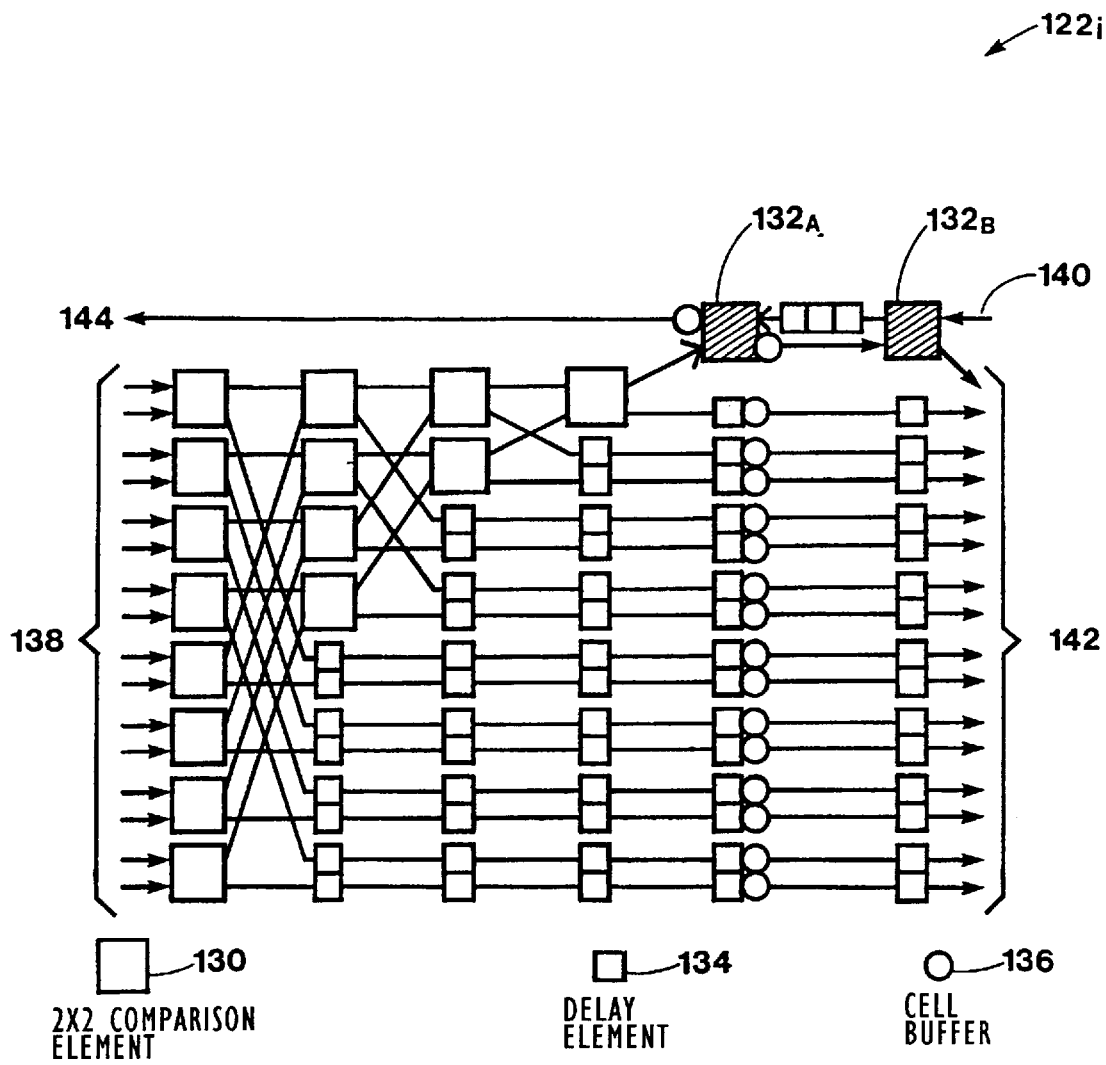
FIG. 15 is a block diagram of a simple column module of the output port controller of FIG. 14.

FIG. 15 shows an exemplary design of the internal architecture of a L+1 input, L+1 output column module $122_i$ for which L=16, constructed in accordance with one preferred embodiment of the invention. The column module $122_i$ is composed of L+1 simple 2×2 comparison elements 130, 132A and 132B, a number of single-input/single-output delay elements 134, and L single-input/single-output buffers 136. The 2×2 comparison elements 130 each have two inputs on their left side and two output links, an upper link and a lower link, on their right side. The comparison elements 130 each compare the priority information contained in the cell headers of incoming cells, and output the cell with the higher priority from the upper link and the cell with the lower priority from the lower link. The comparison elements 132A and 132B are essentially the same as the comparison elements 130, however they have one input link on the lower left side and the other input link on the upper right side. The higher priority output of the comparison element 132A or 132B is on the upper left side and the lower priority output is on the lower right side.

In any given time slot, up to L cells arrive at the input column 138 of an arbitrary column module $122_i$ from the column module $122_{i-1}$. The L inputs are paired and enter a first stage of L/2 comparator elements 130. The L/2 winners (ie. the L/2 cells with the highest priorities) from the first stage are then sent to a further stage of L/4 comparator elements 130, from which L/4 winners are selected. The winners from this second stage are sent to a further stage of comparators, and the process continues until the cell with the highest priority of the cells which arrived in the input column 138 (the "input column winner") is selected (in the case of a tie a winner is arbitrarily chosen). The input column winner is then sent to the comparator 132A, where it must compete with the cell that was the winner of a competition that occurred in the comparator 132B during the previous time slot. The winner of the competition which occurs in the comparator 132A is the overall winner for the column module $122_i$ for the particular time slot, and it is sent to the left, through an output link 144, to the comparator 132B of the column module $122_{i-1}$. At the same time, the losing cell from the comparator 132A of the column module $122_i$ is sent to comparator 132B, where it competes with the cell that was the overall winner for the column module $122_{i+1}$, which arrives from the right via input link 140 into the comparator 132B of the column module $122_i$. The winner of the competition in the comparator 132B remains in the column module $122_i$ to compete with the input column winner from the next time-slot. A series of delay elements 134 are provided between the winning output of the comparator 132B and the upper right input of the comparator 132A to synchronize the current time slot comparator 132B winner with the next time slot input column winner. The current time slot loser of the competition in 132B is output in an L output column 142 with the L–1 losers of the current time slot input column competition. The column module $122_B$ does not include the comparators 132A and 132B as it is the input column winner which must be sent back through the output link 144 to the previous column module $122_{B-1}$. A number of delay elements 134 are provided to ensure that all the cells progressing through the column module $122_i$ are kept in synchronization with each other. Cell buffers 136 are provided to temporarily store the cells which lose competitions to the winning cells. This buffering allows a losing cell to be looped back rather than be dropped immediately since all cells arriving at the input column 138 are awaiting delivery to the output link 144. The buffers are also required to allow the loop controller to handle bursty traffic.

Figure 16:
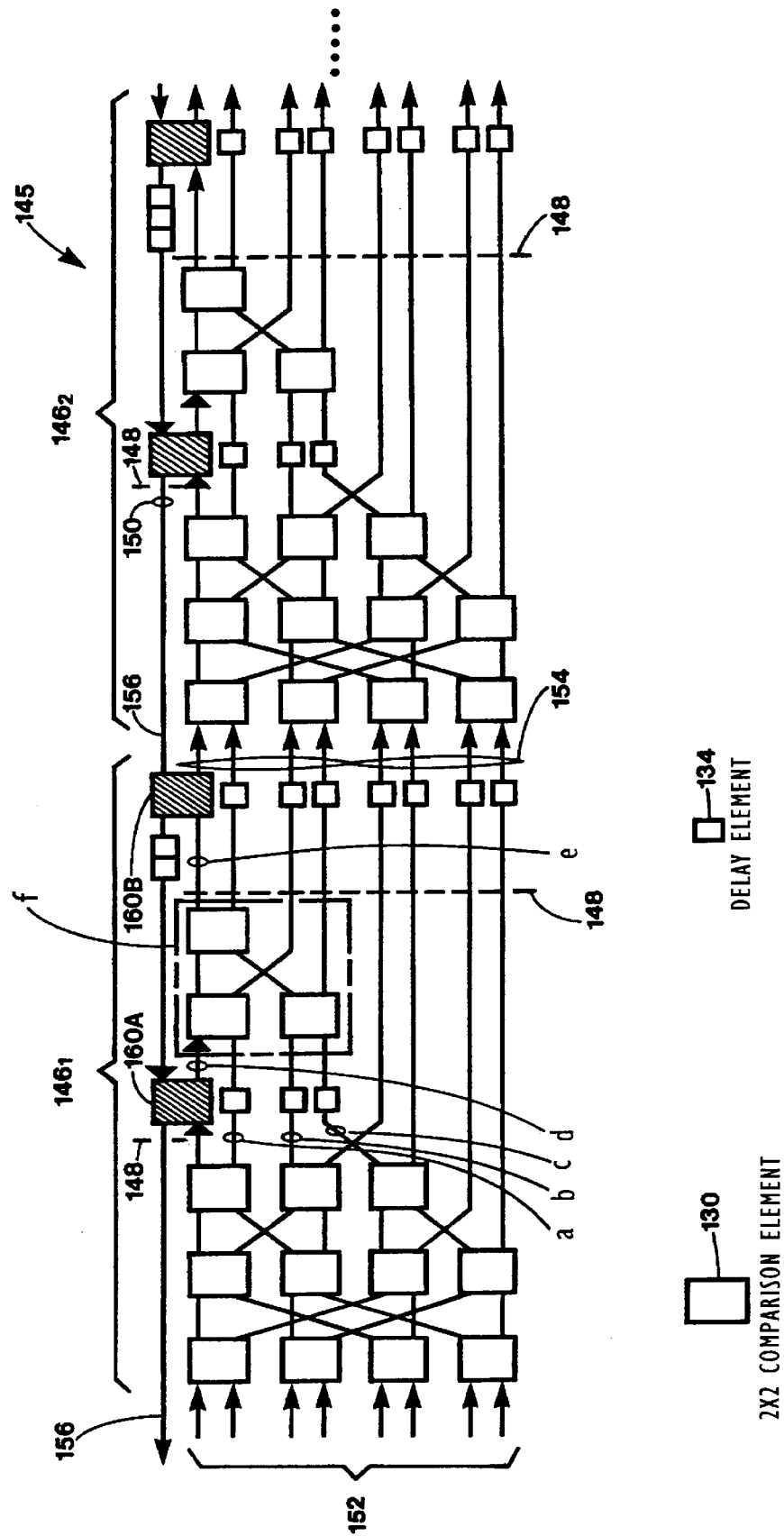
FIG. 16 is a block diagram of a further preferred embodiment of the output port controller of FIG. 14.

It will be appreciated that given the design of column modules $122_i$, the loop controller 120 (if comprised of column modules $122_1$ to $122_B$) cannot guarantee to deliver the highest priority cell in the whole output controller system from its output $126_{L+1}$ in a given time slot. Although the column module $122_i$ shown in FIG. 15 and described above is a workable design, it is described herein primarily for permitting a more readily understandable teaching of the column module and loop controller designs of the invention described hereinafter. In order to provide a guarantee that the cell with the overall highest priority in an output port controller system is the cell that is output, the design of the loop controller column module $122_i$ can be modified as shown in FIG. 16. In accordance with a further embodiment of the present invention, FIG. 16 shows exemplary column modules $146_1$ and $146_2$ of B column modules of a further loop controller 145, in which L=8.

The column modules $146_1$ to $146_B$ are (L+1)-input, (L+1)-output column modules. Each column module includes a number of 2×2 comparison elements 130, 160A and 160B, and a number of a delay elements 134. The column modules $146_1$ to $146_B$ each includes (L+1) cell buffers which are indicated by the dashed lines 148 in the FIG. 16. A buffer is located whenever the dashed lines 148 cross a link line.

At a given time slot, the buffer indicated by 150 in the column module $146_2$ contains the highest priority cell contained in the second and all subsequent modules (the column modules $146_2$ to $146_B$). The buffer "e" stores the second highest priority cell in the column $146_1$. At the next time slot, the highest priority cell for the whole loop controller 145 is either the cell in the buffer indicated by 150 or is the second highest priority cell in the buffer "e" (the highest priority cell in the first module $146_1$ having been output on line 156) or is the highest priority cell in the newly arriving cells at the input column 152. Therefore, the two comparators 160B and 160A are used to find out the highest priority cell from these three possibilities. The comparator 160B compares the cell delivered from buffer 150 and the second highest priority cell from "e" in $146_1$ obtained from the last time slot. The winning cell goes forward to comparator 160A and compares the cell with the highest priority cell from 152. The winning cell from 160A is the highest priority cell contained in the loop controller 145 and is stored in the buffer 148 at the winning output of the comparator 160A. In the exemplary embodiment (specifically for L=8), the second highest priority cell can be found at location "a", "b", "c" or "d" and a set of comparators, indicated by "f", are used to find the second highest priority cell.

The column module $146_B$ is the last column module in the loop controller in FIG. 16. The design of $146_B$ is different from other column modules $146_1$ to $146_{B-1}$. For column module $146_B$, the highest priority cell is fed back to column module $146_{B-1}$ in the next time slot. Therefore, column module $146_B$ has the same design as that of column module $122_B$ and has only one buffer space. In total, there are B(L+1)−L buffer spaces in the loop controller 145.

The repeated cycling of the cells through the loop controller 145 leads to an overall system that can guarantee the in-sequence delivery of the highest priority cell in the system. However, the cells cannot utilize the buffers in the system efficiently. This is because each column module $146_i$ can only feed one cell back to column module $146_{i-1}$. A further embodiment shown in FIG. 17 comprises an exemplary loop controller A with four column modules. The design of an exemplary column module $C_i$ (where i is not B) is similar to the column module $146_j$ (where j is not B) of FIG. 16. The difference is that the column of delay elements 134 under the comparator 160B in the loop controller 145 are replaced with another column of 2×2 comparison elements. These columns are indicated by $D_1$, $D_2$ and $D_3$ in loop controller A. Column $D_1$ allows the losing cells from column $D_2$ to compete with losing cells (not the two chosen highest priority cells) in column module $C_1$. Accordingly, the losing cells may again contend for the buffer spaces.

Figure 17:
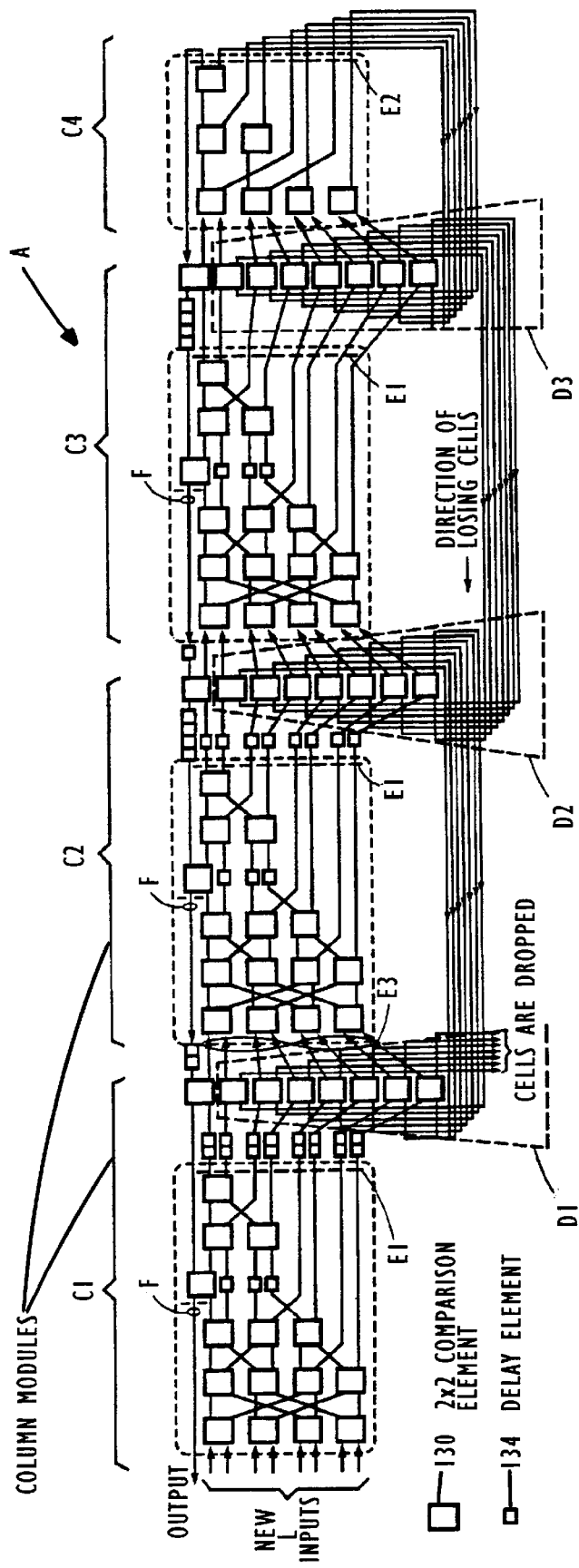
FIG. 17 is a block diagram of a still further embodiment of the output port controller of FIG. 14.

Other operations of loop controller A of FIG. 17 are identical to those of the loop controller 145 except for column module $C_B$ (being $C_4$ in FIG. 17). In loop controller A, the last column module $C_B$ differs slightly from module $146_B$. The column module $C_B$ allows the feeding back of all cells including the winning and losing cells. L buffer spaces are provided at the output of module $C_B$ and, therefore, in total B(L+1)−1 buffer spaces are provided in loop controller. With the replaced column of 2×2 comparators and the looping back feature of the loop controller A, there are no dropped cells at the last column. Most of the high priority cells accumulate at the back end of the loop controller except the top row with winning outputs indicated by F. Cell drop occurs only after column $D_1$.

Figure 18:
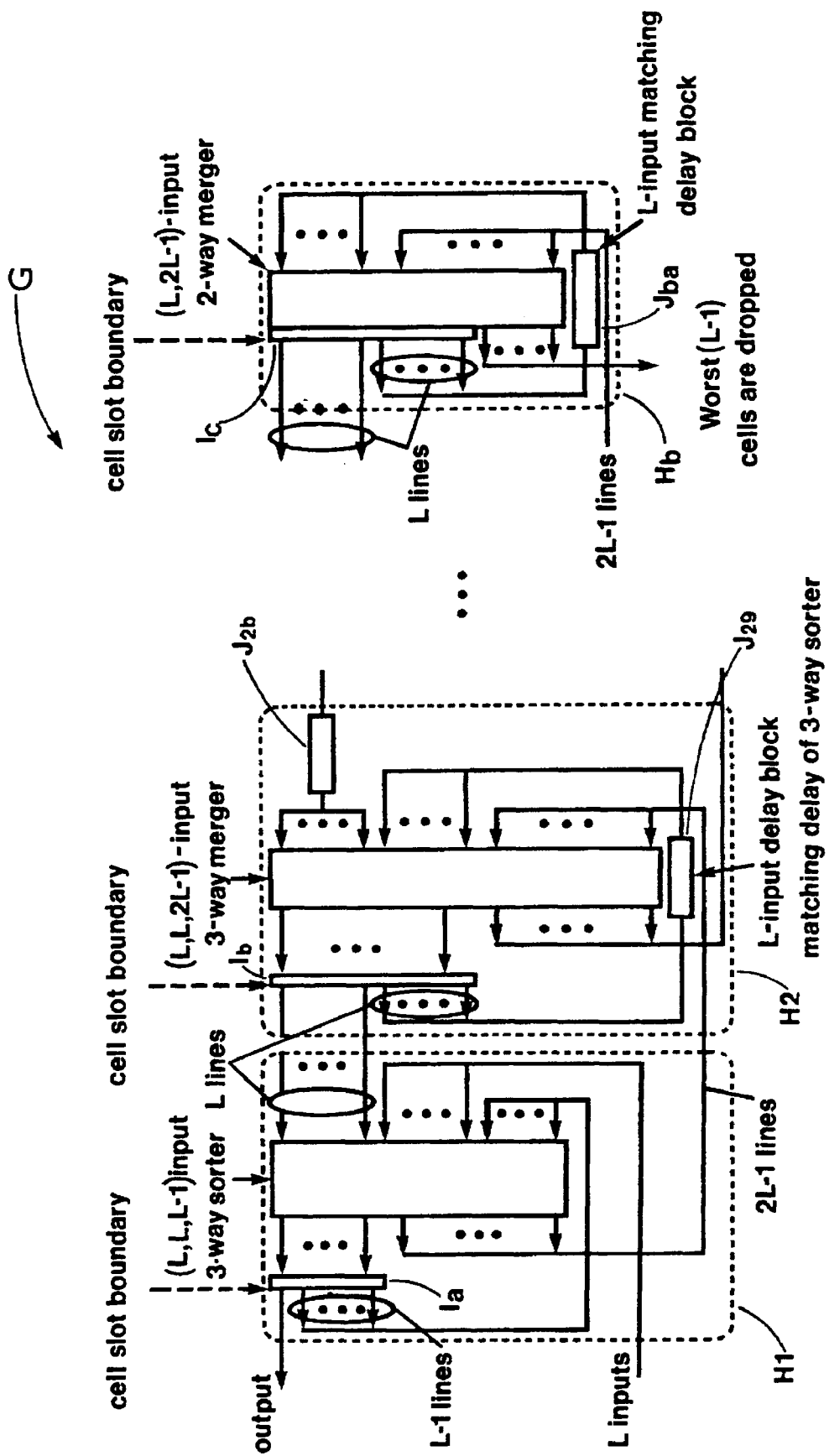
FIG. 18 is a block diagram of a still further embodiment of the output port controller of FIG. 14.

The loop controller A is a high performance, low complexity self-routing loop controller. FIG. 18 illustrates a further embodiment of a loop controller G having higher hardware complexity to provide a push-out mechanism for achieving the best possible performance of a multiplexing system given static prioritized input streams of traffic. In this embodiment, the L highest priority cells are fed backward from $H_i$ to $H_{i-1}$, except $H_1$ to which only one cell is delivered to the output port in any time slot. In the loop controller G, the column modules $H_2$ to $H_{B-1}$ are identical. A column module $H_i$ (1<i<B) accepts three sorted input sequences, one from $H_{i+1}$ with size L, one from $H_{i-1}$ with size 2L−1 and one from $H_i$ with size L which are stored in the buffer $I_b$ during the last time slot. Therefore, an (L,L,2L−1)-input 3-way merger is required to produce a sorted list at its output. The 2L highest priority cells are stored in the column of buffers $I_b$, the highest L priority cells will be delivered to $H_{i-1}$ at the beginning of the next time slot and the other L cells in $I_b$ are re-circulated back to the same module for competition during the next time slot. The last module $H_B$ is different in design having only two input sorted sequences and this module discards the lowest priority cells in the whole controller. For the first module $H_1$, a buffer size of L is provided, the highest priority cell is delivered and the next L−1 highest priority cells in the system are recirculated to $H_1$ again in the next time slot to compete with newly arriving L inputs as well as those coming from $H_2$. If the newly arriving L inputs are not sorted, an (L,L,L−1)input 3-way sorter is required to provide a sorted list at the outputs. It is necessary to provide delay matching blocks, for example, the $J_{2a}$, $J_{2b}$ and $J_{Ba}$, as shown in FIG. 18. The loop controller G includes a total of L(2B−1) buffer spaces.

The first column of any of the above loop controllers can be simplified if the controller is attached to the core switch fabric 10 since the outputs provided by the latter are sorted.

From the above description, it will be appreciated that the present invention provides a novel and useful output queuing switch architecture with decentralized control. The output queuing architecture provides improved delay and throughput performance when compared to other queuing methods such as input queuing and shared queuing. The throughput of the switch architecture of the present invention can approach close to 100% if a proper value of L is used.

Specifically, one aspect of the present invention provides a novel and useful core switch fabric 10 for use in an output queuing multicast switch with priority sorting capabilities. The switch fabric 10 is expandable to large dimensions and has a delay/throughput performance which exceeds that of previously available switches. The core switch fabric architecture provides a basic building block that can be used to construct large scale ATM switches without changing the architecture of the basic building block. Physically, the core switch fabric can be realized as an array of three-dimensional parallel processors. The distribution and concentration sections can be completely partitioned and this partitioned switch fabric provides a flexible distributed architecture, which permits the simplification of the operation and maintenance of an entire switching system. The modularity of the switch fabric implies less stringent synchronization requirements and makes higher speed implementations possible. The modular switch fabric is intended to meet the needs of broadband exchanges of a wide variety of sizes.

The concentration section 12 of the present invention is a novel concentrator design which ensures that the L highest priority cells can be delivered to an output port when more than L cells destined for the same output port arrive in the same time slot. The novel structure of the concentration section (which, as explained above is comprised of N N-to-L priority concentrating sorters constructed from two basic blocks, namely L-sorters and 2L-to-L concentrating sorters) permits the concentration section to be easily expanded.

The concentration section of the present invention offers the further advantage that no internal speedup factor is required within concentration section of the core switch fabric 10. The only internal speedup requirement in the core switch fabric 10 is in the radix-r distribution networks of the distribution section in order to accommodate the extra cell header (address) information required for multicasting. The VIA scheme (particularly the variable length VIA scheme) helps to minimize this speedup requirement. The fact that no internal speedup is required in the concentration section of the core switch fabric facilitates the expandability of the switch as the same basic components of the concentration section can be used in switches of varying sizes without changing the internal architecture of the basic components.

The variable length VIA scheme of the present invention is another novel aspect of the present invention. When compared with other addressing schemes, the VIA scheme generally permits fewer bits to be included in the address field used by a switch fabric.

Although the use of a 3-D physical arrangement of a switch architecture has been addressed in the prior literature (see above), the switch architecture of the present invention is unique in that it provides a single switch design, meaning that the basic design of the core switch fabric remains the same when the switch is expanded.

The core switch fabric 10 of the present invention provides a further advantage over prior art switches in that it contains no internal buffering. The core switch fabric operates on a FIFO basis (ie. in-order cell delivery). Due to the lack of internal buffers, bursty traffic has no impact on the core switch fabric.

The output port controllers disclosed herein are a further novel aspect of the present invention. In view of prior art output controllers (such as the L-input-to-1-output implementation of the StarBurst switch disclosed in U.S. Pat. No. 5,274,642 to Widjaja et al. issued Dec. 28, 1993) the output port controllers of the present invention have a simpler architecture. The distributed control output controller A of FIG. 17 offers a combination of high performance and low design complexity. The perfromance of the output controller A is close to that of the push-out controller G of FIG. 18, with a simpler design.

Another advantage of both the core switch fabric and output port controller designs of the present invention is that they each allow for a number of priority classes that is limited only by the length of the priority field. Other prior art switching arrangements require the use of priority queues which can significantly limit the number of priority classes available in such switches. The core switch fabric and the output port controller designs of the presnt invention do not require priority queues.

While various embodiments of this invention have been illustrated in the accompanying drawings and described above, it will be evident to those skilled in the art that changes and modifications may be made therein without departing from the essence of this invention. All such modifications or variations are believed to be within the sphere and scope of the invention as defined by the claims appended hereto.

What is claimed is:

1. A distributed control self-routing, modular, switching arrangement for distributing and concentrating data packets input thereto in an asynchronous transfer mode system wherein said data packets each comprise address information to identify one or more addresses 1 through N and priority information, said switching arrangement comprising:

(a) a distribution section comprising N distribution networks each having one input and N outputs wherein each said input is linked to one or more outputs 1 through N associated therewith depending upon the address(es) of the data packet at said input, each of said distribution networks being of a radix-r tree configuration comprising a plurality of linked multicast elements each having one input link and a plurality of output links, the number of said output links depending upon the value of r, and wherein an extra cell header associated with each data packet comprises said address information for said data packet, said address information comprising data identifying the output links of each of said multicast elements to which said data packet is to be transferred, each of said multicast elements comprising means for processing said address information and transferring said data packet from said input of each said multicast element to none, all or specified ones of said output links of each said multicast element according to said address information; and (b) a concentration section comprising N priority concentration sorters each having N inputs and L outputs, L being less than N, wherein said sorters comprise means for ordering data packets input thereto according to the priority information in said data packets and for transferring to said outputs only the L data packets from said N inputs which have the highest relative priorities.

2. The switching arrangement according to claim 1 wherein the length of said extra cell header is variable and determined by the output links of said multicast elements to which said data packet is to be transferred, wherein said extra cell header excludes data identifying descendent output links to which said data packet is not transferred when said data packet is also transferred to the ascendent output link(s) of said descendent output links.

3. The switching arrangement according to claim 1 wherein said switching arrangement is a first switching arrangement and further comprises a plurality of said switching arrangements interconnected to form a multiplicity of interconnected modular switching arrangements.

4. An output port controller for multiplexing sets of up to L data packets input to said controller at successive time slots according to their relative priority levels and for producing as an output one data packet having a higher relative priority, said controller comprising means for comparing the priority levels of said sets of data packets input at successive time slots, means for queuing said data packets received during time slots prior to the current time slot and means for outputting in each time slot one data packet of said sets of up to L data packets having a higher relative priority, wherein said controller is of a loop configuration comprising multiple successive stages of said comparing means wherein the data packet having the highest relative priority in each stage but the first is output from the comparing means of such stage, looped back and input to the comparing means the previous stage, wherein the data packet having the highest relative priority in the first stage comparing means is the output of said controller.

5. a distributed control self-routing, modular, switching arrangement for distributing and concentrating data packets input thereto in an asynchronous transfer mode system wherein said data packets each comprise address information to identify one or more addresses 1 through N and priority information, said switching arrangement comprising:

(a) a distribution section comprising N distribution networks each having one input and N outputs wherein each said input is linked to one or more outputs 1 through N associated therewith depending upon the address(es) of the data packet at said input;

(b) a concentration section comprising N priority concentration sorters each having N inputs and L outputs, L being less than N, wherein said sorters comprise means for ordering data packets input thereto according to the priority information in said data packets and for transferring to said outputs only the L data packets from said N inputs which have the highest relative priorities, wherein each of said priority concentration sorters includes N/2L basic concentrator units each having 2L inputs and L outputs, said concentrator units each comprising means for ordering data packets input thereto according the priority information in said data packets and for transferring to said L outputs only the L data packets from said 2L inputs which have the highest relative priorities, wherein the outputs of said distribution networks are connected to the inputs of said priority concentration sorters by a plurality of connecting links such that the N outputs of each of said distribution networks are each connected to an input of a different priority concentration sorter, and the N inputs of each of said priority concentration sorters are each connected to an output of a different distribution.

6. The switching arrangement according to claim 5 wherein each of said basic concetrator units includes two bitonic sorters each having L inputs and L outputs, and a priority concentrating merger having 2L inputs and L outputs, each of said bitonic sorters including sorting means for ordering data packets input thereto according to the priority information in said data packets and transferring said data packets to its L outputs, said priority concentrating merger including concentration means for receiving at its 2L inputs the ordered data packets from each of said bitonic sorters and transferring to its L outputs only the L data packets having the highest relative priorities.

7. The switching arrangement according to claim 6 wherein each of said priority concentration sorters include a further priority concentrating merger for every two basic concentrator units, the outputs of said two basic concentrator units each being connected to a unique input of said further priority concentrating merger.

8. The switching switching arrangement according to claim 5 wherein said switching arrangement is a first switching arrangement and further comprises a plurality of said switching arrangements interconnected to form a multiplicity of interconnected modular switching arrangements.

9. The switching arrangement according to claim 5 wherein each of said connecting links are substantially the same length.

10. The switching arrangement according to claim 9 wherein said distribution section is packaged in a first integrated circuit chip and said concentration section is packaged in a second integrated circuit chip.

11. The switching arrangement according to claim 5 wherein said distribution section and said concentration section are implemented using three dimensional packaging techniques so that said distribution networks are arranged orthogonal to said priority concentration sorters.

12. A distributed control output port controller for receiving sets of up to L data packets input to said controller at successive time slots and for producing as an output in successive time slots one data packet having a higher relative priority, said controller comprising:

(a) multiple successive module stages, each stage including:
  (i) L inputs;
  (ii) L outputs;
  (iii) a loopback input;
  (iv) a highest priority output;
  (v) a plurality of feedback inputs;
  (vi) a plurality of feedback outputs;
  (vii) selection means for selecting in a current time slot the data packet having the highest relative priority and the data packet having the second highest relative priority from data packets input at said L inputs and said loopback input in the current time slot and the data packet selected by said selection means in the preceding time slot as having the second highest relative priority in said preceding time slot, said selection means including means for storing the data packet selected as having the second highest relative priority in the current time slot;
  (viii) comparison means for comparing the priority of at least some of the data packets not selected by said selection means in the current time slot with the priority of data packets input at said feedback inputs in the current time slot, and outputting at said feedback outputs the data packets having the lower priority levels as determined by said comparison means; and
  (ix) means for outputting the data packet selected as having the highest relative priority in the current time slot at said highest priority output and outputting at said L outputs the data packets input to said stage in said current time slot other than the data packets selected by said selective means and other than the data packets output at said feedback outputs; and (b) a final successive module stage including:
  (i) L further inputs;
  (ii) a further highest priority output;
  (iii) a further plurality of feedback outputs; and
  (iv) further selection means for selecting in a current time slot the data packet having the highest relative priority from the data packets input to said L further inputs in the current time slot, and for outputting at said furhter highest priority output said highest relative priority data packet and for outputting at said further plurality of feedback outputs the data packets other than said highest relative priority data packet, wherein said stages are arranged such that the data packet selected as having the highest relative priority in the current time slot in each stage but the first stage is looped back and input in the subsequent time slot at the loopback input of the previous stage, the data packets output at the feedback outputs of each of the stages during the current time slot are input as the feedback inputs of the previous stage during the current time slot, and the data packets output on said L outputs of each of said successive stages other than the final stage are input to said L inputs of the subsequent stage in the subsequent time slot, the data packet selected by the first stage in each time slot as having the highest relative priority being the output of the controller and the data packets input to the L inputs of the first sage being the input to the controller.

13. A distribution section of a multicast switching arrangement for distributing data packets input thereto in an asynchronous transfer mode system wherein said data packets each comprise address information to identify one or more addresses 1 through N and priority information, said distribution section comprising:

N distribution networks each having one input and N outputs wherein each said input is linked to one or more outputs 1 through N associated therewith depending upon the address(es) of the data packet at said input, each of said distribution networks being of a radix-r tree configuration comprising a plurality of linked multicast elements each having one input link and a plurality of output links, the number of said output links depending upon the value of r, and wherein an extra cell header associated with each data packet comprises said address information for said data packet, said address information comprising data identifying the output links of each said multicast elements to which said data packet is to be transferred, each said multicast elements comprising means for processing said address information and transferring said data packet from said input of each said multicast elements to none, all or specified ones of said output links of each said multicast elements according to said address information, wherein the length of said extra cell header is variable and determined by the output links of said multicast elements to which said data packet is to be transferred, wherein said extra cell header excludes data identifying descendent output links to which said data packet is not transferred when said data packet is also not transferred to the ascendent output link(s) of said descendent output links.

\* \* \* \* \*